US008751608B2

(12) United States Patent
Sogo

(10) Patent No.: US 8,751,608 B2
(45) Date of Patent: Jun. 10, 2014

(54) SERVICE SHIFTING METHOD, SHIFT MANAGEMENT SERVER, TERMINAL, SERVICE SERVER, SERVICE SHIFT PROGRAM AND SERVICE SHIFT SYSTEM

(75) Inventor: Takushi Sogo, Tokyo (JP)

(73) Assignee: NEC Corporation, Tokyo (JP)

( * ) Notice: Subject to any disclaimer, the term of this patent is extended or adjusted under 35 U.S.C. 154(b) by 531 days.

(21) Appl. No.: 13/144,204

(22) PCT Filed: Aug. 13, 2009

(86) PCT No.: PCT/JP2009/064294
§ 371 (c)(1),
(2), (4) Date: Jul. 12, 2011

(87) PCT Pub. No.: WO2010/024130
PCT Pub. Date: Mar. 4, 2010

(65) Prior Publication Data
US 2012/0005314 A1 Jan. 5, 2012

(30) Foreign Application Priority Data

Aug. 28, 2008 (JP) .................................. 2008-220228
Feb. 9, 2009 (JP) .................................. 2009-027642

(51) Int. Cl.
*G06F 15/16* (2006.01)
*H04L 29/08* (2006.01)
*H04L 29/06* (2006.01)
*A63F 13/12* (2006.01)

(52) U.S. Cl.
CPC ............ *H04L 67/14* (2013.01); *H04L 65/1066* (2013.01); *H04L 29/0619* (2013.01); *A63F 2300/53* (2013.01); *A63F 13/12* (2013.01)
USPC .......................................... 709/219; 709/227

(58) Field of Classification Search
CPC . H04L 67/14; H04L 65/1066; H04L 29/0619; A63F 2300/53; A63F 13/12
USPC ............................. 709/231, 227, 219; 725/87
See application file for complete search history.

(56) References Cited

U.S. PATENT DOCUMENTS

| 7,277,947 | B1 * | 10/2007 | Van De Sluis et al. | ........ | 709/227 |
| 2002/0091834 | A1 | 7/2002 | Isozu et al. | | |
| 2003/0229900 | A1 * | 12/2003 | Reisman | .......................... | 725/87 |
| 2006/0041674 | A1 * | 2/2006 | Reme | ............................ | 709/231 |
| 2006/0123131 | A1 * | 6/2006 | Almaula et al. | .............. | 709/231 |

FOREIGN PATENT DOCUMENTS

| JP | 2002-176432 | 6/2002 |
| JP | 2007-104163 | 4/2007 |
| JP | 2007-140712 | 6/2007 |

OTHER PUBLICATIONS

Takao Nakanishi et al., "Ubiquitous Network ni Okeru Service Mobility Gijutsu no Teian", NTT R&D, vol. 52, No. 3, pp. 223 to 230, Mar. 10, 2003.
International Search Report, PCT/JP2009/064294, Nov. 17, 2009.

* cited by examiner

*Primary Examiner* — Jungwon Chang
(74) *Attorney, Agent, or Firm* — Young & Thompson

(57) ABSTRACT

A method makes possible the transfer independent services used on a certain terminal to another terminal and easy use of them. A service transferring method of transferring service being used at a transferring source terminal (TST) to a transferring destination terminal (TDT), in which information about correlation between a session ID which identifies a session between a service server which provides the service and the TST using the service and a terminal ID of the TST is stored in at least either one of the service server and a transfer management server (TMS), and either one of the TST and TDT transmits terminal IDs of the one terminal and the other terminal to the TMS to notify service transfer and upon receiving the notification of the service transfer, the information about correlation between the session ID and the terminal ID recorded in either the service server or the TMS updates.

29 Claims, 30 Drawing Sheets

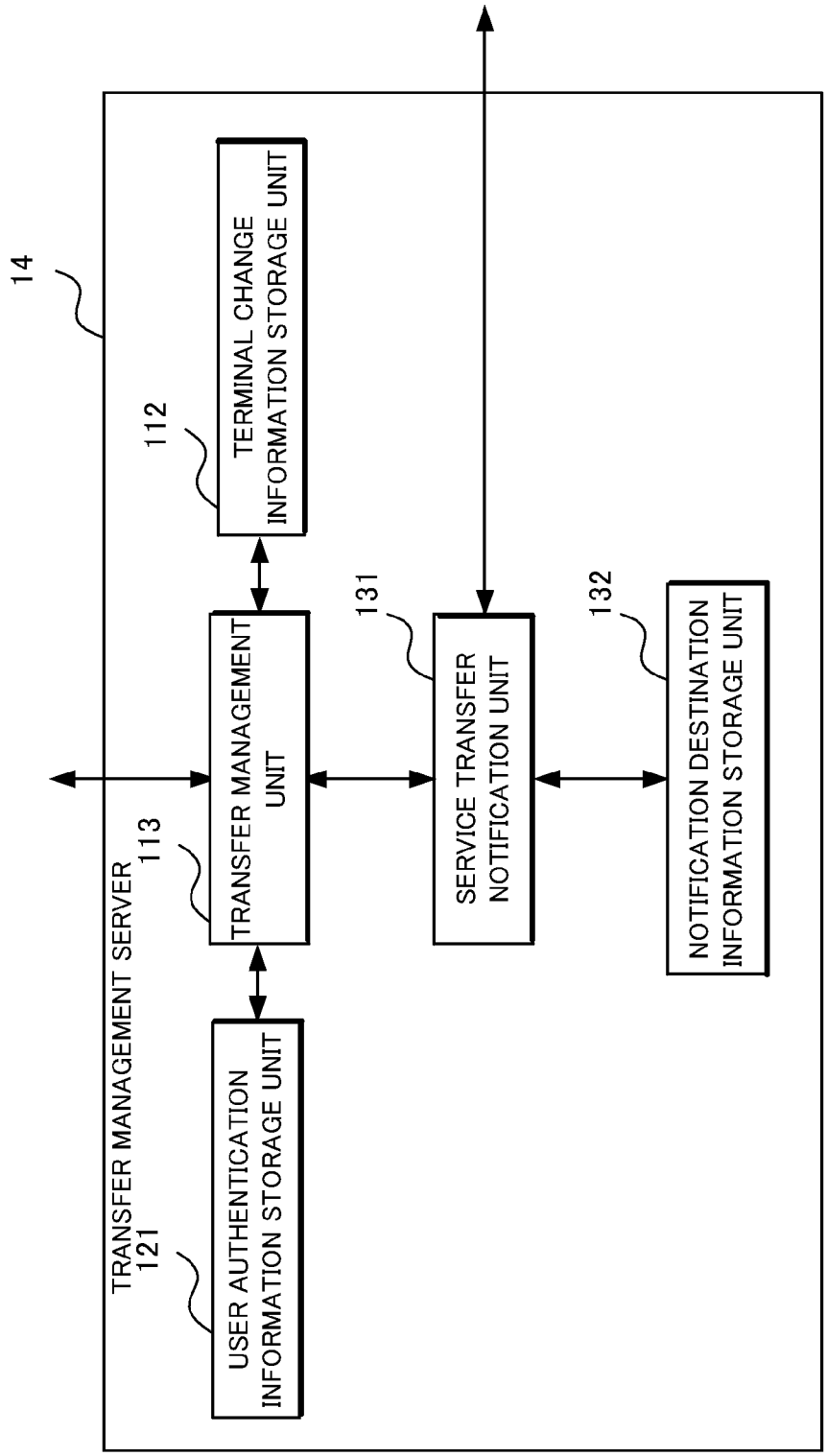

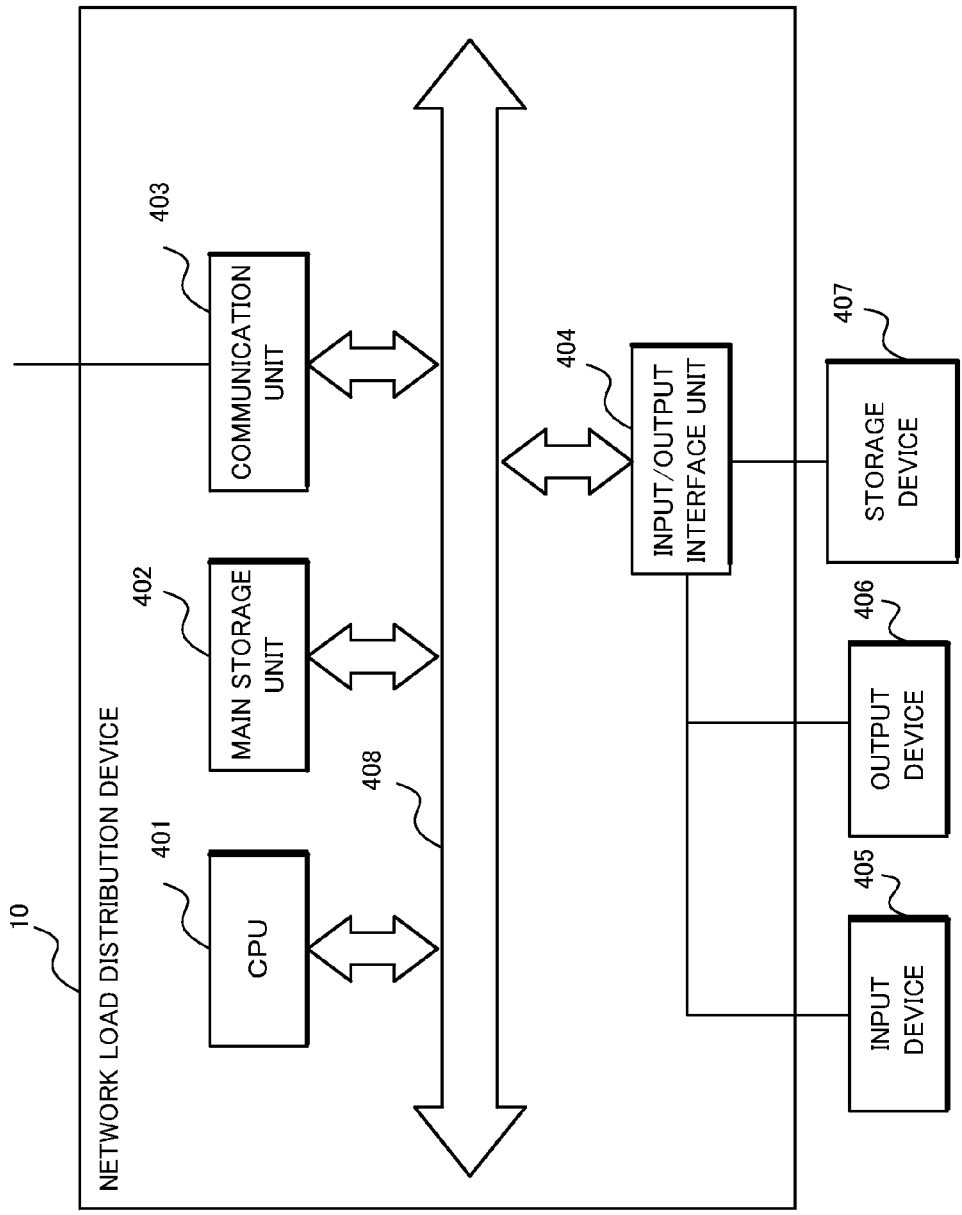

SERVICE SHIFTING METHOD, SHIFT MANAGEMENT SERVER, TERMINAL, SERVICE SERVER, SERVICE SHIFT PROGRAM AND SERVICE SHIFT SYSTEM

TECHNICAL FIELD

The present invention relates to an on-line service system which provides service from a server to a terminal (client) by using session information and the like, and more particularly, a method of transferring service between terminals for transferring, between terminals, a plurality of services used on the terminals with ease, and a terminal, a server and a service system therefor.

BACKGROUND ART

As functions of recent mobile terminals improve such as notebook personal computers, mobile phones, PDA (Personal Digital Assistant) and game consoles, there is an increasing need for, in the course of use of various kinds of on-line services such as Web and on-line game on terminals including a desktop personal computer, a television set and a car navigation system, transferring service to another terminal (e.g. mobile terminal) as required to continuously use the service on the terminal as the transferring destination. Possible is, for example, transferring service to a cellular phone while on-line shop is used on a Web by a desktop personal computer.

For realizing such processing, it is a common practice to incorporate a function for service transferring (service transferring function) into an individual service application on a server which provides service. Description will be made, for example, of a case where a user using on-line shop by a personal computer halfway starts continuous use of the service on a cellular phone.

For thus enabling a user who uses on-line shop by a personal computer to halfway start continuous use of the service by a cellular phone, a service temporary interruption function and a use resuming function as a service transferring function are mounted on a Web site (service application) which provides on-line shop service.

When a user selects the temporary interruption function during the use of service by the personal computer, information indicative of a state of the service being used (session information) is stored on a server side. In this state, when the user successively accesses a Web site for cellular phone by using a cellular phone as a service transferring destination to execute user authentication and further selects the use resuming function, the use can be resumed from a state of temporary interruption by restoring the session information of the service which is stored before on the server side.

Disclosed in Patent Literature 1 is a method of a server client system in which data held by a client terminal is transferred to other terminal as it is, so that a terminal as a transferring destination takes over a state of a client application as of before switching and receives service from a server.

The method recited in Patent Literature 1 enables continuous use of service by transferring information indicative of a state of service being used on a terminal as a transferring source (session information) to other terminal as a transferring destination to restore the session information interrupted on the transferring destination terminal.

Disclosed in Patent Literature 2 is a method which realizes service transfer between terminals with a special gateway provided between a server and a terminal. In this method, the gateway manages session information between the server and the terminal, based on which information, communication between the server and the terminal is appropriately switched to realize service transfer between the terminals.

Patent Literature 1: Japanese Patent Laying-Open No. 2007-140712

Patent Literature 2: Japanese Patent Laying-Open No. 2002-176432

When a plurality of services independent from each other which are provided by a plurality of service providers are used on one terminal and transferred to another terminal, however, there are the following problems.

First problem is that when transferring service between terminals by using such a service transferring function as described above which is incorporated into a service application, operation will be extremely complicated for a user. The reason is that with a service transferring function provided for each service application, even when transferring operation is executed in any one of service applications, none of its information is shared by other service applications, so that the transferring operation should be repeatedly executed for each service used by the user.

Another problem is a large development burden for a service provider. The reason is that the service transferring function should be incorporated into each service application.

Second problem is that when information indicative of a state of service being used on a terminal as a transferring source (session information) is directly transferred to other terminal as a transferring destination, service security might not be maintained by the method recited in Patent Literature 1. The reason is that only the transfer of session information between terminals enables service switching, which prevents a server (service application) side from recognizing service transfer of the terminals. It might happen, for example, that by copying session information of service being used by a certain user onto other terminal by using wireless communication such as wireless LAN or infrared communication by a third party, he or she uses the service as it is.

Third problem is that in such a case where a network between the server and the terminal is under the management of a communication service provider as in a case of a cellular phone network, service transfer cannot be realized by such a method which realizes transfer of service between terminals with a special gateway provided between a server and a terminal as recited in Patent Literature 2. The reason is that when the network is under the management of a service communication provider, neither a terminal user nor a service provider is allowed to dispose a gateway between a server and a terminal.

The method recited in Patent Literature 2 has a further problem that no transfer of service can be realized in such a case where a plurality of terminals are connected to different networks as a cellular phone and a personal computer. The reason is that it is difficult to dispose a common gateway between a plurality of terminals connected to different networks and a plurality of servers.

In addition, when a special gateway is provided for realizing transfer between terminals in a wide area network, a bottleneck might occur on communication. The reason is that all the communication between servers and terminals pass through the gateway.

OBJECT OF THE PRESENT INVENTION

An object of the present invention is to provide a method of transferring service between terminal devices which method enables a plurality of independent services used on a certain terminal to be transferred to other terminal and used with ease, and a terminal device, a server and a service system therefor.

Another object of the present invention is to provide a method of transferring service between terminal devices which method enables a service application development burden to be mitigated by separating a service transferring function commonly required for transferring service from each service application, and a terminal device, a server and a service system therefor.

A further object of the present invention is to provide a method of transferring service between terminals which method enables security in transferring service between terminals to be maintained by recognizing transfer of a terminal on a server side, and a terminal device, a server and a service system therefor.

Still further object of the present invention is to provide a method of transferring service between terminals which method enables service transfer to be realized with ease even under an environment where provision of a gateway between a server and a terminal is difficult and which method enables occurrence of a bottleneck on communication to be suppressed as much as possible, and a terminal device, a server and a service system therefor.

SUMMARY

According to a first exemplary embodiment of the invention, a service transferring method of transferring service being used at a transferring source terminal to a transferring destination terminal, includes a step of recording information about correlation between a session ID and a terminal ID of the transferring source terminal using the service in at least either one of a service server and a transfer management server, which session ID identifies a session between the service server which provides the service and the transferring source terminal, a step, by one of the transferring source terminal and transferring destination terminal, of transmitting a terminal ID of the one terminal and a terminal ID of the other terminal to the transfer management server to notify service transfer, and a step of, upon receiving a notification of the transfer of the service, updating the information about correlation between the session ID and the terminal ID recorded in either the service server or the transfer management server.

According to a second exemplary embodiment of the invention, a transfer management server which manages transfer of service being used by a transferring source terminal to a transferring destination terminal, includes a correlation information storage unit which records information about correlation between a session ID and a terminal ID of the transferring source terminal using the service in at least either one of a service server and a transfer management server, which session ID identifies a session between the service server which provides the service and the transferring source terminal, and a transfer management unit which, when a request for obtaining a session ID related to the terminal ID of the transferring source or transferring destination terminal is made from the service server having received a service request from the transferring destination terminal, notifies the service server of the session ID related to the terminal ID of the transferring source or transferring destination terminal by referring to the correlation information.

According to a third exemplary embodiment of the invention, a transfer management server which manages transfer of service being used by a transferring source terminal to a transferring destination terminal, includes a notification destination information storage unit which stores notification destination information of at least one service server including a service server that provides the service, a transfer management unit which receives, from the transferring source terminal or the transferring destination terminal, a notification of transfer of service with a terminal ID of the terminal in question and a terminal ID of the other terminal, and a service transfer notification transmission unit which, when receiving a notification of transfer of the service, transmits a service transfer notification with the terminal ID of the transferring source terminal and the terminal ID of the transferring destination terminal to the service server stored in the notification destination information storage unit.

According to a fourth exemplary embodiment of the invention, a transfer management server which manages transfer of service being used by a transferring source terminal to a transferring destination terminal, includes a notification destination information storage unit which stores notification destination information of at least one service server including a service server that provides the service, a transfer management unit which receives, from the transferring source terminal and the transferring destination terminal, a notification of transfer of service with a terminal ID of the terminal in question and an identification ID which is unique between the transferring source terminal and the transferring destination terminal, a terminal change information storage unit which, when receiving a notification of transfer of the service, stores a pair of the terminal ID of the transferring source terminal and the identification ID and a pair of the terminal ID of the transferring destination terminal and the identification ID so as to correspond to each other as terminal change information, and a service transfer notification transmission unit which transmits a service transfer notification with the terminal ID of the transferring source terminal and the terminal ID of the transferring destination terminal to the service server stored in the notification destination information storage unit by referring to the terminal change information storage unit.

According to a fifth exemplary embodiment of the invention, a terminal which uses service provided by a service server, includes a terminal ID storage unit which stores a terminal ID applied to each terminal, at least one client application for transmitting the terminal ID to the service server to make a service request, and a service transfer management unit which transmits the terminal ID of the other terminal as a service transferring source or a service transferring destination and the terminal ID of the terminal in question to a transfer management server which stores information about correlation between a session ID which identifies a session between the service server and the transferring source terminal using the service and the terminal ID of the transferring source terminal to notify transfer of service between the terminals.

According to a sixth exemplary embodiment of the invention, a terminal which uses service provided by a service server, includes a terminal ID storage unit which stores a terminal ID applied to each terminal, at least one client application for transmitting the terminal ID to the service server to make a service request, and a service transfer management unit which transmits the terminal ID of the terminal in question and an identification ID which is unique with respect to the other terminal as a service transferring source or a service transferring destination to the transfer management server to notify transfer of service.

According to a seventh exemplary embodiment of the invention, a service server which provides a terminal with service, includes a session information storage unit which stores information about a session with the transferring source terminal using the service, a function of transmitting a session ID which identifies the session information and a terminal ID of the transferring source terminal to a transfer management server which records information about correlation between the session ID and the terminal ID of the transferring source terminal, and a function of obtaining a session ID related to the terminal ID of the transferring source or transferring destination terminal from the correlation information of the transfer management server upon receiving a service request from the transferring destination terminal and transmitting the session ID obtained to the transferring destination terminal According to a eighth exemplary embodiment of the invention, a service server which provides a terminal with service, includes a session information storage unit which stores information about a session with the transferring source terminal using the service and a terminal ID of the transferring source terminal so as to be correlated with each other, a service transfer notification receiving unit which receives a service transfer notification from a transfer management server, and a function of, when the service transfer notification receiving unit receives a service transfer notification from the transfer management server, rewriting the terminal ID correlated with the session information of the session information storage unit.

According to a ninth exemplary embodiment of the invention, a program to be executed on a terminal that uses service provided by a service server, which causes the terminal to execute a processing of transmitting a terminal ID applied to each terminal to the service server to make a service request, and a processing of transmitting the terminal ID of the other terminal as a service transferring source or transferring destination and the terminal ID of the terminal in question to a transfer management server which stores information about correlation between a session ID which identifies a session between the service server and the transferring source terminal using the service and the terminal ID of the transferring source terminal to notify transfer of the service between the terminals.

According to a tenth exemplary embodiment of the invention, a program to be executed on a terminal that uses service provided by a service server, which causes the terminal to execute a processing of reading a terminal ID applied to each terminal from a terminal ID storage unit, at least one client application for transmitting the terminal ID to the service server to make a service request, and a processing of transmitting a terminal ID of the terminal in question and an identification ID which is unique with respect to the other terminal as a service transferring source or a service transferring destination to the transfer management server to notify transfer of the service.

According to a eleventh exemplary embodiment of the invention, a program to be executed on a transfer management server that manages transfer of service being used by a transferring source terminal to a transferring destination terminal, which causes the transfer management server to execute a processing of recording, in a correlation information storage unit, information about correlation between a session ID and a terminal ID of the transferring source terminal using the service in at least either one of a service server and a transfer management server, which session ID identifies a session between the service server which provides the service and the transferring source terminal, and a processing of referring to the correlation information to notify the service server of the session ID related to the terminal ID of the transferring source or transferring destination terminal when a request for obtaining a session ID related to the terminal ID of the transferring source or transferring destination terminal is made from the service server having received a service request from the transferring destination terminal.

According to a twelfth exemplary embodiment of the invention, a program to be executed on a transfer management server that manages transfer of service being used by a transferring source terminal to a transferring destination terminal, which causes the transfer management server to execute a processing of reading notification destination information of at least one service server including a service server that provides the service from a notification destination information storage unit, a processing of receiving, from the transferring source terminal or the transferring destination terminal, a notification of transfer of service with a terminal ID of the terminal in question and a terminal ID of the other terminal, and a processing, when receiving a notification of transfer of the service, of transmitting a service transfer notification with a terminal ID of the transferring source terminal and a terminal ID of the transferring destination terminal to the service server read from the notification destination information storage unit.

According to a thirteenth exemplary embodiment of the invention, a program to be executed on a transfer management server that manages transfer of service being used by a transferring source terminal to a transferring destination terminal, which causes the transfer management server to execute a processing of reading notification destination information of at least one service server including a service server that provides the service from a notification destination information storage unit, a processing of receiving, from the transferring source terminal and the transferring destination terminal, a notification of transfer of service with a terminal ID of the terminal in question and an identification ID which is unique between the transferring source terminal and the transferring destination terminal, a processing of recording a pair of the terminal ID of the transferring source terminal and the identification ID and a pair of the terminal ID of the transferring destination terminal and the identification ID so as to correspond to each other as terminal change information in a terminal change information storage unit when receiving a notification of transfer of the service, and a processing of referring to the terminal change information storage unit to transmit a service transfer notification with the terminal ID of the transferring source terminal and the terminal ID of the transferring destination terminal to the service server read from the notification destination information storage unit.

According to a fourteenth exemplary embodiment of the invention, a program to be executed on a service server that provides a terminal with service, which causes the service server to execute a processing of storing information about a session with a transferring source terminal using the service, a processing of transmitting a session ID which identifies the session information and a terminal ID of the transferring source terminal to a transfer management server which records information about correlation between the session ID and the terminal ID of the transferring source terminal, and a processing of obtaining a session ID related to the terminal ID of the transferring source or transferring destination terminal from the correlation information of the transfer management server upon receiving a service request from the transferring destination terminal and transmitting the session ID obtained to the transferring destination terminal.

According to a fifteenth exemplary embodiment of the invention, a service transferring system which transfers service being used by a transferring source terminal to a transferring destination terminal, includes a service server which provides the service, and a transfer management server which stores information about correlation between a session ID which identifies a session between the service server and the transferring source terminal using the service and a terminal ID of the transferring source terminal, wherein the transferring source terminal and the transferring destination terminal comprise at least one client application for transmitting a terminal ID applied to each terminal to the service server to make a service request, and a service transfer management unit which transmits a terminal ID of the terminal in question and a terminal ID of the other terminal to the transfer management server to notify transfer of service, and wherein the service server having received a service request from the transferring destination terminal obtains a session ID related to the terminal ID of the transferring source or transferring destination terminal from the correlation information of the transfer management server and transmits the session ID obtained to the transferring destination terminal.

According to a sixteenth exemplary embodiment of the invention, a service transferring system which transfers service being used by a transferring source terminal to a transferring destination terminal, includes a service server which provides the service to store information about correlation between information about a session with the transferring source terminal using the service and a terminal ID of the transferring source terminal, and a transfer management server which stores notification destination information of at least one service server including the service server, wherein the transferring source terminal and the transferring destination terminal comprise at least one client application for transmitting a terminal ID applied to each terminal to the service server to make a service request, and a service transfer management unit which transmits a terminal ID of the terminal in question and a terminal ID of the other terminal to the transfer management server to notify transfer of service, and wherein the transfer management server having received a notification of service transfer from the transferring destination terminal or the transferring source terminal notifies the service transfer to the service server.

The present invention enables a plurality of independent services used on one terminal to be transferred to other terminal by one operation with ease.

The present invention also enables a service transferring function commonly required for transferring service to be separated from a service application to reduce a service application development burden.

Also according to the present invention, recognizing terminal transfer on a server side enables security in service transfer between terminals to be maintained.

Furthermore, the present invention realizes service transfer even in such a case where a network between a service server and a terminal is under the management of a communication provider as a cellular phone network or in such a case where a plurality of terminals are connected to different networks as in a case of a cellular phone and a personal computer.

Moreover, according to the present invention, a bottleneck is unlikely to occur on communication even when transfer between terminals is realized in a wide area network.

BRIEF DESCRIPTION OF THE DRAWINGS

FIG. 39 is a block diagram showing a structure of a transfer management server according to the eleventh exemplary embodiment; and FIG. 40 is a block diagram showing an example of a hardware structure of a terminal according to the present exemplary embodiment of the present invention.

EXEMPLARY EMBODIMENT

Next, exemplary embodiments of the present invention will be detailed with reference to the drawings.

First Exemplary Embodiment

Figure 1:
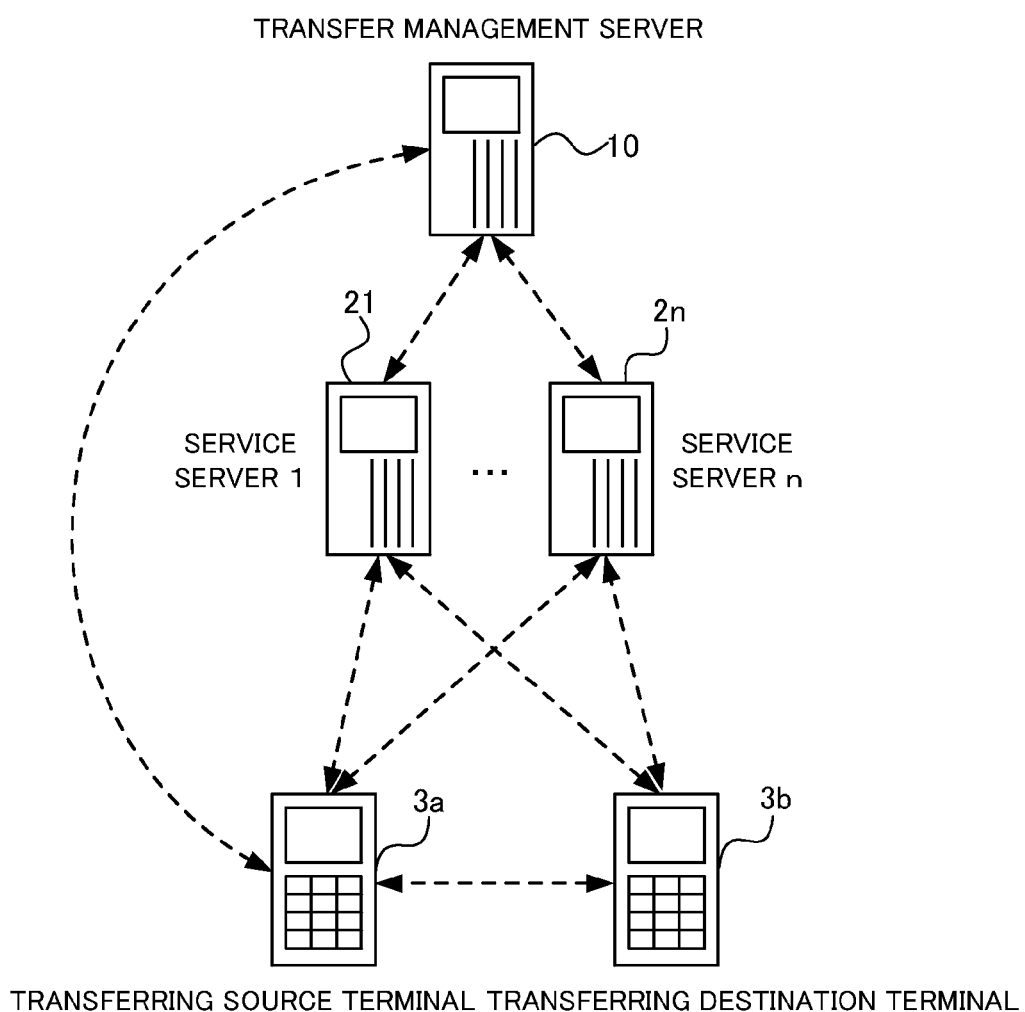
FIG. 1 is a block diagram showing a structure of a system according to a first exemplary embodiment of the present invention.

With reference to FIG. 1, a system according to a first exemplary embodiment of the present invention includes one or a plurality of service servers 21 to 2n which provide various kinds of services on a network including the Internet, terminals 3a and 3b for a user to access the service servers 21 to 2n and receive service provision and a transfer management server 10 which manages transfer of service between the terminals 3a and 3b.

In FIG. 1, description will be made with the terminal 3a as a transferring source terminal for use by a user to first receive provision of service and with the terminal 3b as a transferring destination terminal to which the user thereafter transfers the service.

Figure 2:
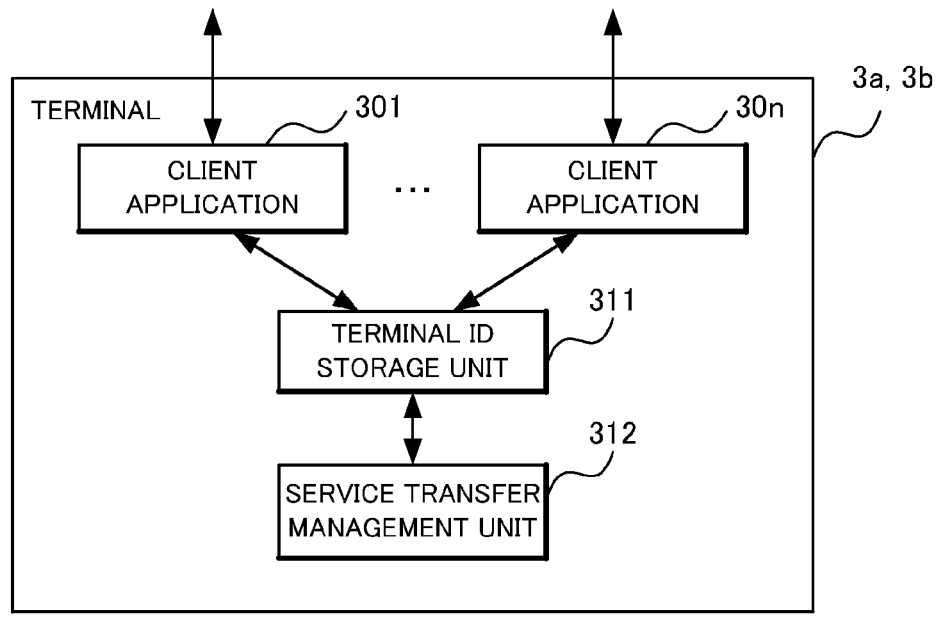
FIG. 2 is a block diagram showing a structure of a terminal according to the first exemplary embodiment.

Further with reference to FIG. 2, the terminal 3a and the terminal 3b each include one or a plurality of client applications 301 to 30n which connect to the service servers 21 to 2n to provide a user with various kinds of services, a terminal ID storage unit 311 which holds a terminal ID (identification information) applied to each terminal for unitarily identifying a terminal, and a service transfer management unit 312 which executes processing of transferring service between the terminals.

In a case of service using a Web browser such as on-line shop on Web, a Web server (Web site) is equivalent to the service servers 21 to 2n and a Web browser (and contents realizing on-line shop) is equivalent to the client applications 301 to 30n. When a plurality of Web servers (Web sites) are simultaneously used on one terminal, a Web browser (and contents) displaying each Web site is considered to be each independent client application for convenience' sake.

Figure 3:
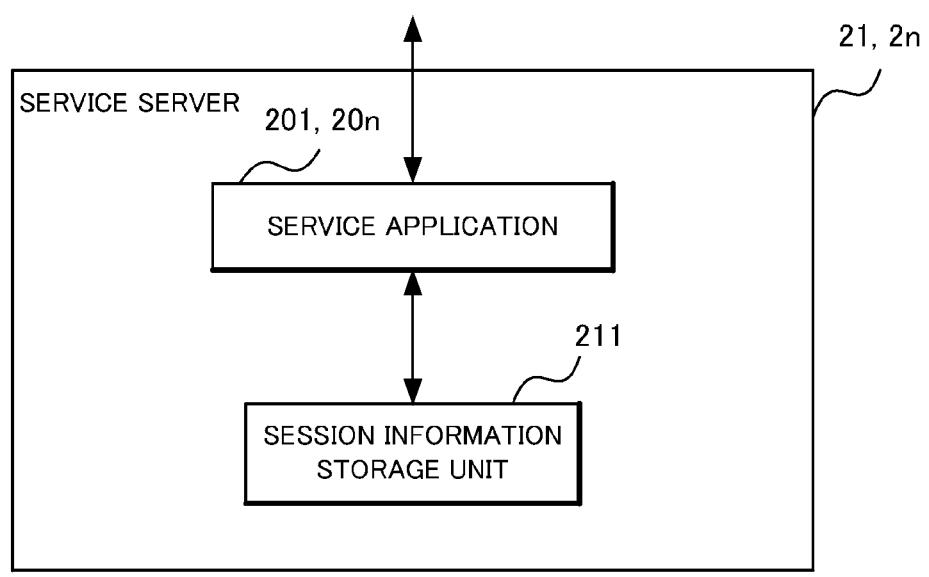
FIG. 3 is a block diagram showing a structure of a service server according to the first exemplary embodiment.

Structure of the service servers 21 to 2n is shown in FIG. 3. The service servers 21 to 2n include service applications 201 to 20n which provide various kinds of services on the network, and a session information storage unit 211.

While shown in FIG. 3 is an example where the service servers 21 to 2n each comprise one of the service applications 201 to 20n, each of the service servers 21 to 2n may include one or a plurality of service applications.

Figure 4:
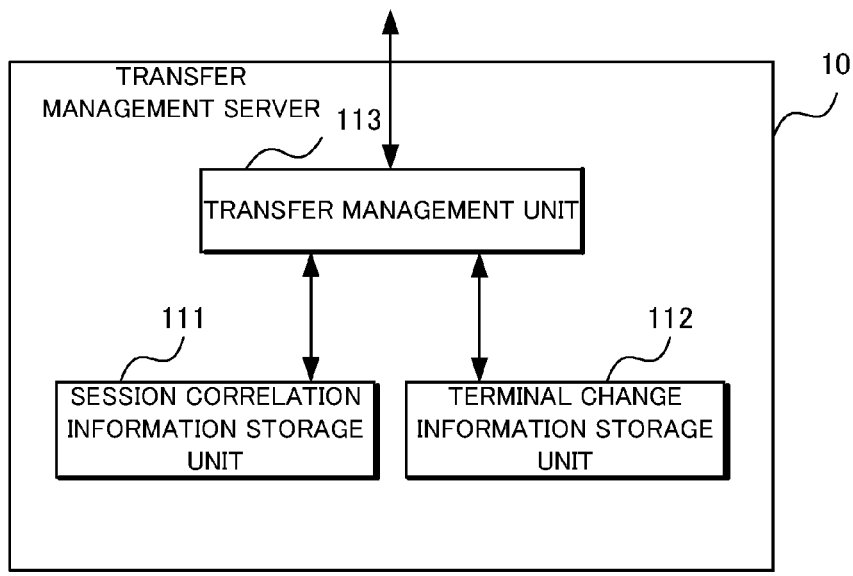
FIG. 4 is a block diagram showing a structure of a transfer management server according to the first exemplary embodiment.

Structure of the transfer management server 10 is shown in FIG. 4. The transfer management server 10 includes a session correlation information storage unit 111, a terminal change information storage unit 112 and a transfer management unit (transfer management application) 113.

In the structures of the terminals 3a and 3b shown in FIG. 2, the service servers 21 to 2n shown in FIG. 3 and the transfer management server 10 shown in FIG. 4, characteristic components related to the present exemplary embodiment are illustrated and no illustration is made of other components commonly provided as a terminal and a server.

With respect to the above-described components of the terminals 3a and 3b, the service servers 21 to 2n and the transfer management server 10, their functions will be described in the following.

In the service servers 21 to 2n, the service applications 201 to 20n for providing each service operate respectively.

The client applications 301 to 30n operative on the transferring source terminal 3a provide service to a user while appropriately communicating with the service servers 21 to 2n based on user's operation (connection destinations of the client applications 301 to 30n are assumed to be the service servers 21 to 2n, respectively. This is also the case in the following).

The service transfer management unit 312 of the transferring source terminal 3a executes processing of transferring service between terminals by obtaining the other terminal's terminal ID through communication with the service transfer management unit 312 of the transferring destination terminal 3b and transmitting the obtained terminal ID and its own terminal ID to the transfer management unit 113 of the transfer management server 10 to notify the unit of service transfer.

The transfer management unit 113 of the transfer management server 10 holds, in the session correlation information storage unit 111, session correlation information 901 which correlates session information to be used by a service application with a terminal ID.

Description will be here made of a typical example of a method of holding session information and session correlation information.

Figure 7:
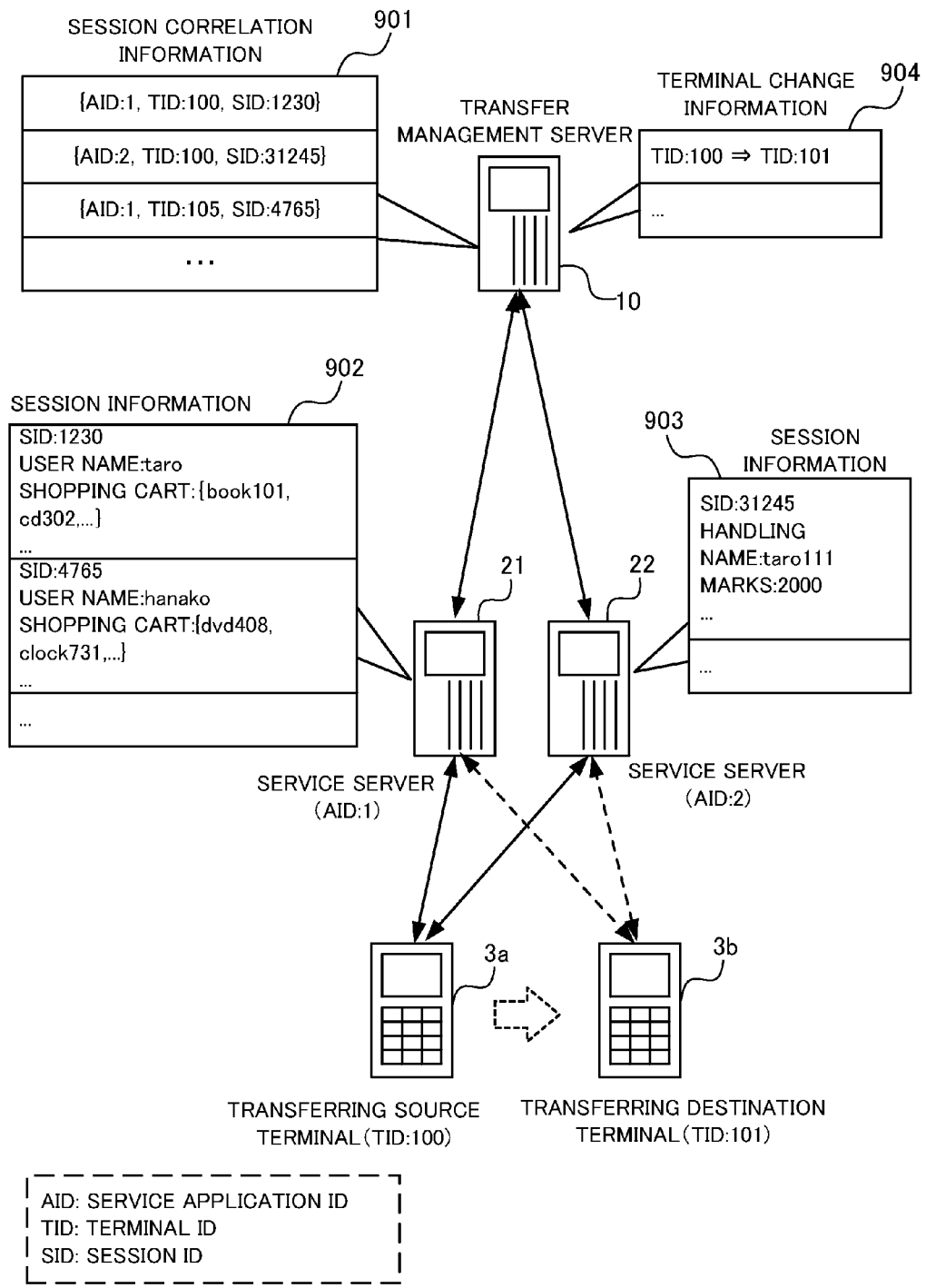
FIG. 7 is a diagram showing a specific example of session correlation information according to the first exemplary embodiment.

As shown in FIG. 7, in the session information storage units 211 of the service servers 21 and 2n, session information 902 and session information 903 to which a session ID is applied are stored.

Figure 5:
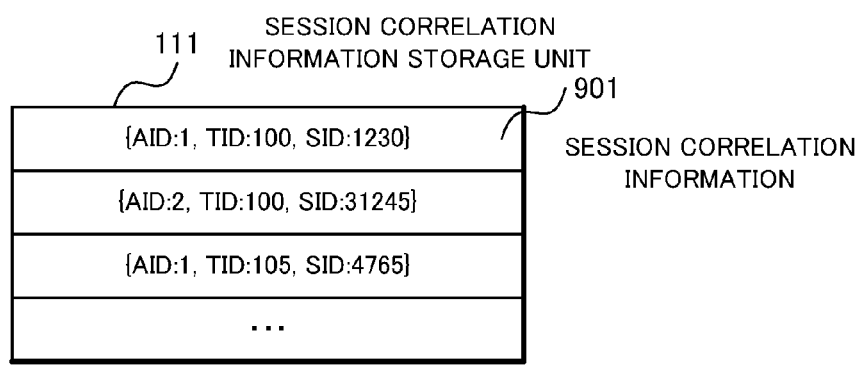
FIG. 5 is a block diagram showing a structure of the terminal according to the first exemplary embodiment.

As shown in FIG. 5, the transfer management unit 113 of the transfer management server 10 stores a set of a session ID, a terminal ID and an application ID for identifying a service server in the session correlation information storage unit 111 as the session correlation information 901.

Using these information enables the service servers 21 and 2n (the service applications 201 to 20n) to restore session information from the terminal ID. In the example shown in FIG. 7, for example, when connection is made from the terminal 3a to the service server 21, the service server 21 transmits its own application ID (AID: 1) and a terminal ID (TID: 100) to the transfer management server 10. From the transfer management unit 113 of the transfer management server 10, a session ID (SID: 1230) corresponding to these application ID and terminal ID is returned based on the session correlation information 901 stored in the session correlation information storage unit 111. This allows the service server 21 to restore correct session information.

Figure 6:
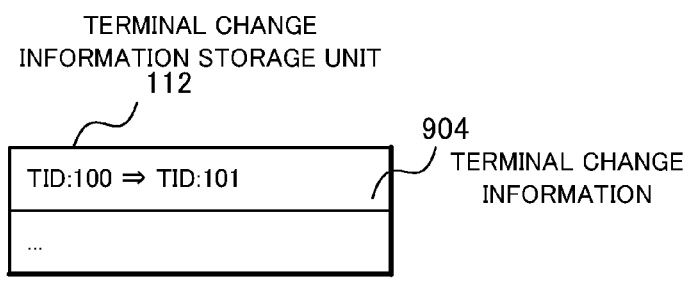
FIG. 6 is a block diagram showing a structure of the terminal according to the first exemplary embodiment.

When a user further executes operation of transferring service from the transferring source terminal 3a to the transferring destination terminal 3b, a change of the terminal ID is recorded in the terminal change information storage unit 112 of the transfer management server 10. In the example of terminal change information 904 shown in FIG. 6, change from the terminal ID (TID: 100) to the terminal ID (TID: 100) is recorded in the terminal change information storage unit 112.

When connection from the transferring destination terminal 3b to the service server 2n, for example, is executed through this operation, the service server 21 transmits its own application ID (AID: 1) and a terminal ID (TID: 101) of the terminal 3b to the transfer management server 10. From the transfer management server 10, a session ID (SID: 1230) corresponding thereto is returned based on the session correlation information 901 and the terminal change information 904. This enables the service server 2n to restore correct session information even after transferring of the service between the terminals.

During operation of transferring service between terminals, a part of the terminal ID of the session correlation information 901 may be directly rewritten in place of recording such terminal change information 904 as described above by the transfer management server 10 (in the above-described example, the TID: 100 of the session correlation information 901 is rewritten into the TID: 101). In this case, it will be unnecessary to provide the transfer management server 10 with the terminal change information storage unit 112.

Operation of the First Exemplary Embodiment

Figure 8:
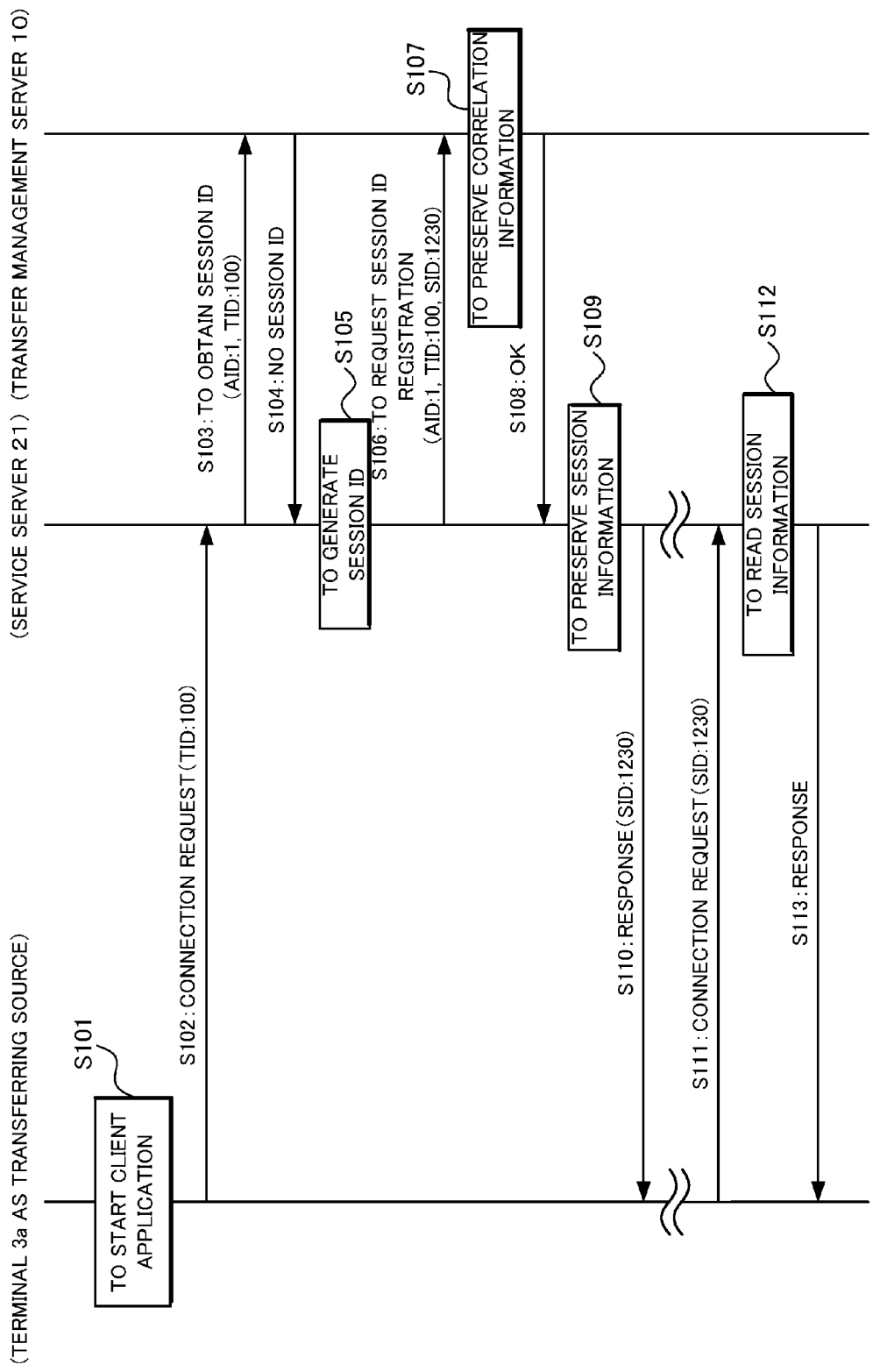
FIG. 8 is a flow chart showing operation according to the first exemplary embodiment.

Next, with reference to FIG. 1 through FIG. 7 and the flow chart of FIG. 8, detailed description will be made of the entire operation of the present exemplary embodiment.

First, when a user operates the terminal 3a to start one of client applications (assumed to be the client application 301 here) (Step S101 in FIG. 8), the client application 301 transmits a connection request to the service server 21 with a terminal ID (TID: 100) as an argument (Step S102).

For obtaining a session ID corresponding to the transmitted terminal ID (TID: 100) and its own application ID (AID: 1), the service server 21 having received the connection request connects to the transfer management server 10 to inquire the transfer management unit 113 of the corresponding session ID (Step S103). Since connection to the service server 21 of the terminal 3a is the first and a session ID is yet to be generated here, the transfer management unit 113 of the transfer management server 10 returns to the service server 21a response that no corresponding session ID exists (Step S104).

Then, the service server 21 newly generates such a session ID indicated on the first line of the session information 902 shown in FIG. 7 (Step S105). The service server 21 further requests the transfer management server 10 for the registration of the generated session ID (SID: 1230) so as to be correlated with an application ID and a terminal ID (Step S106).

The transfer management unit 113 of the transfer management server 10 receives the session ID (SID: 1230), the application ID and the terminal ID from the service server 21 and registers them as the session correlation information 901 in the session correlation information storage unit 111 (Step S107). Furthermore, the transfer management unit 113 of the transfer management server 10 returns a notification of registration completion of the session correlation information to the service server 21 (Step S108).

Thereafter, the service server 21 executes processing necessary for service provision, stores session information which will be necessary in the future as required in the session information storage unit 211 (Step S109) and lastly, returns a response together with the session ID (SID: 1230) to the terminal 3a (Step S110). The terminal 3a executes such processing as screen display for receiving provision of service based on the response.

The user further operates the terminal 3a and when a need of connection to the service server 21 again arises, connects to the service server 21 with the session ID (SID: 1230) as an argument (Step S111). The service server 21 reads session information corresponding to the session ID from the session information storage unit 211 (Step S112) and executes necessary processing to return a response to the terminal 3a.

As operation to follow, execute the processing of Steps S111, S112 and S113. When a user activates other client application, the same processing as that of Steps 101 to S113 will be repeated with respect to the activated application.

Subsequently, description will be made of operation executed when transferring the service used by the terminal 3a to the transferring destination terminal 3b.

Figure 9:
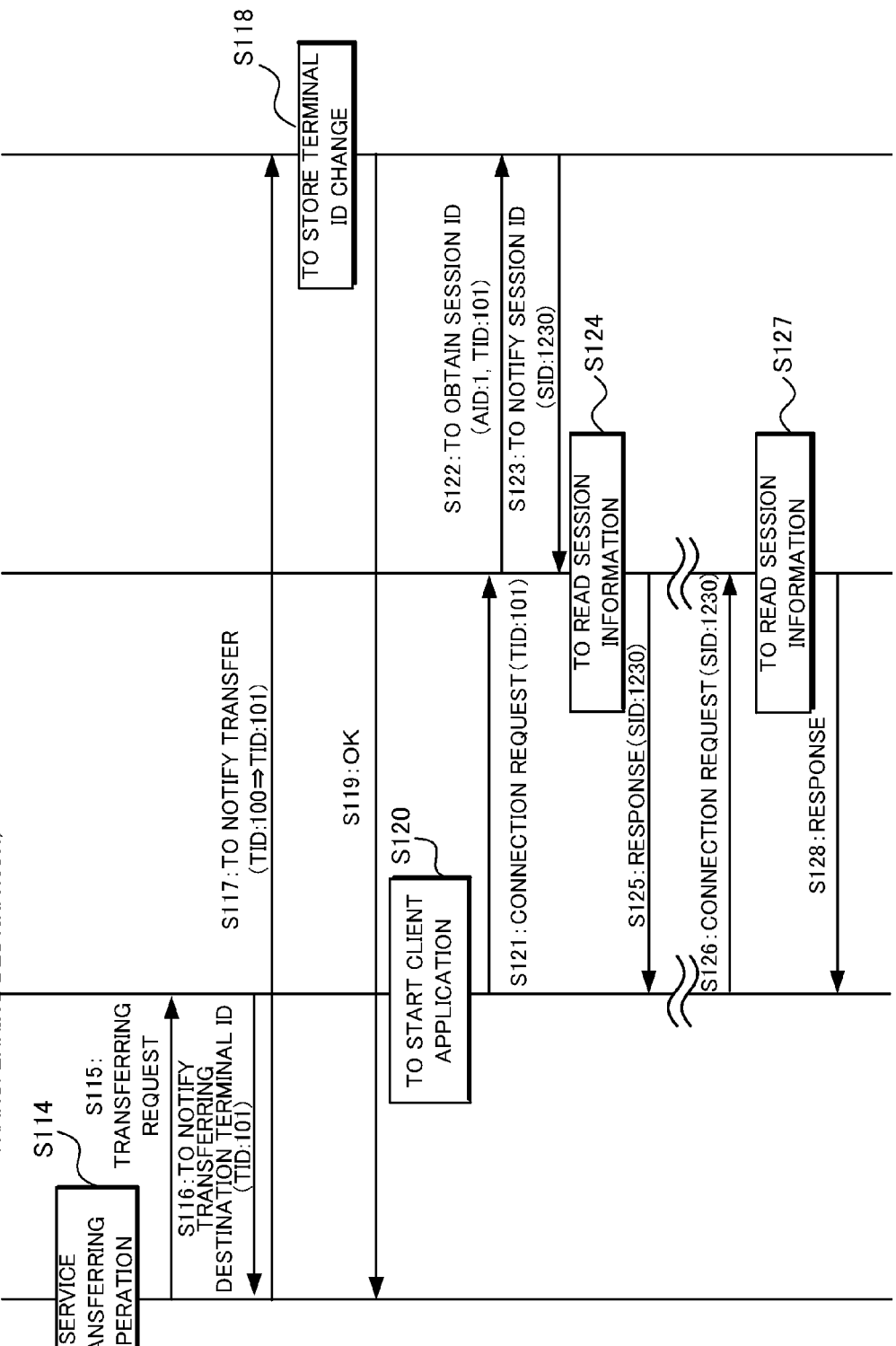
FIG. 9 is a flow chart showing operation according to the first exemplary embodiment.

First, the user operates the terminal 3a as the transferring source to execute service transferring operation (Step S114 in FIG. 9). Then, the service transfer management unit 312 of the transferring source terminal 3a communicates with the service transfer management unit 312 of the terminal 3b as the transferring destination to obtain the terminal ID (TID: 101) of the terminal 3b as the transferring destination (Steps S115 and S116).

Then, the service transfer management unit 312 of the terminal 3a notifies the transfer management server 10 of the service transfer with the obtained terminal ID (TID: 101) of the terminal 3b as the transferring destination and its terminal ID (TID: 100) as arguments (Step S117).

The transfer management unit 113 of the transfer management server 10 records, in the terminal change information storage unit 112, that the service is transferred from the terminal 3a (TID: 100) to the terminal 3b (TID: 101) as the terminal change information 904 (Step S118) and returns a notification of recording completion to the terminal 3a (Step S119).

Thereafter, when the user operates the terminal 3b as the transferring destination to activate the client application 301, for example (Step S120), the client application 301 makes a connection request (service request) to the service server 21 with the terminal ID (TID: 101) as an argument (Step S121).

In order to obtain a session ID corresponding to the transmitted terminal ID (TID: 101) and its own application ID (AID: 1), the service server 21 connects to the transfer management server 10 (Step S122).

The transfer management unit 113 of the transfer management server 10 refers to the session correlation information 901 (a set of AID: 1, TID: 100 and SID: 1230) and the terminal change information 904 that the service is transferred from the terminal of the TID: 100 to the terminal of TID: 101 to determine that a session ID related to AID: 1 and TID: 101 is SID: 1230 and returns the session ID (SID: 1230) to the service server 21 (Step S123).

Thereafter, in order to execute processing necessary for service provision, the service server 21 reads session information corresponding to the obtained session ID from the session information storage unit 211 (Step S124) and lastly returns a response together with the session ID (SID: 1230) to the terminal 3b (Step S125). The terminal 3b executes necessary processing such as screen display based on the response.

The user further operates the terminal 3b and when a need for connection to the service server 21 again arises, connects the terminal to the service server 21 with the above-described session ID as an argument (Step S126). The service server 21 reads session information corresponding to the session ID (Step S127) and after executing necessary processing, transmits a response to the terminal 3b (Step S128).

As operation hereafter, repeat the processing of Steps S126, S127 and S128. When the user starts other application on the terminal 3b, the same processing as that of Steps S120 to S128 will be executed for the started application.

Although at Steps S111 and S126, the terminal 3a as the transferring source and the terminal 3b as the transferring destination transmit a session ID in the second and the following connection requests to the service server 21, a terminal ID may be transmitted each time in place of the session ID. In this case, although the service server 21 at Steps S110 and S125 needs no transmission of a session ID to the terminal 3a or the terminal 3b, it is in place necessary to execute the same processing as that of Steps S122 and S123 in order to obtain a session ID from the terminal ID before the service server 21 executes processing of reading session information at Steps S112 and S127.

The communication at Steps S115 and S116 between the service transfer management unit 312 of the terminal 3a as the transferring source and the service transfer management unit 312 of the terminal 3b as the transferring destination may be wireless communication such as wireless LAN or infrared communication or wired connection by a cable. At the time of communication, the terminals may execute authentication by a password or the like in order to confirm that the other party is a proper terminal.

In addition, although the terminal 3a as the transferring source notifies the transfer management server 10 of the transfer at Steps S116 to S119, the terminal 3b as the transferring destination may execute notification. For this arrangement, the terminal 3b as the transferring destination needs to obtain a terminal ID of the terminal 3a as the transferring source at Step S115.

Moreover, although at Step S120, the user starts the client application of the terminal, the client application used by the terminal 3a as the transferring source may be automatically started at the terminal 3b as the transferring destination.

Effects of the First Exemplary Embodiment

Next, effects of the first exemplary embodiment will be described.

Structuring, as a unit which executes processing of transferring service between the terminals 3a and 3b, the transfer management server 10 and the service transfer management unit 312 of the terminals 3a and 3b to be independent of the services 21-2n eliminates the need of executing operation of transferring a plurality of services used on the terminal 3a as a transferring source to other terminal as a transferring destination on a service basis, resulting in completing the processing by one operation.

Since the service transferring function commonly required for transferring service can be separated from the service application of each of the services 21 to 2n, a service application development burden can be reduced.

Although when service transfer is realized by directly transferring a session ID of the terminal 3a as a transferring source to other terminal 3b as a transferring destination, a service server (service application) side is not allowed to recognize service transfer of the terminal to have a possibility of failing to maintain service security according to the related art, the present exemplary embodiment enables security in transferring service between terminals to be maintained because the service server side is allowed to recognize service transfer between the terminals.

Even under an environment in which it is difficult to dispose a gateway between a service server and a terminal, service transfer can be realized with ease. In a case, for example, where a network between a service server and a terminal is under the management of a communication service provider such as a cellular phone network, service transfer can be realized. The reason is that it is unnecessary to dispose a special gateway for transferring service between a service server and a terminal.

In addition, even when a plurality of terminals are connected to a network as in a case of a cellular phone and a personal computer, service transfer can be realized. The reason is that the service transfer management unit and the service server each only need to communicate with the transfer management server and service transfer is not dependent on a network path between the service server and the terminal.

Moreover, even when executing service transfer between terminals in a wide area network, a bottleneck is unlikely to occur on communication. The reason is that communication between the service server and the terminal passes through no specific device.

Second Exemplary Embodiment

Next, a second exemplary embodiment of the present invention will be detailed with reference to the drawings.

A system according to the second exemplary embodiment has a structure which includes the transfer management server 10, one or a plurality of service servers 21 to 2n, a terminal 4a as a transferring source and a terminal 4b as a transferring destination, which is different from the first exemplary embodiment shown in FIG. 1 only in the structures of the transferring source terminal 4a and the transferring destination terminal 4b.

Figure 10:
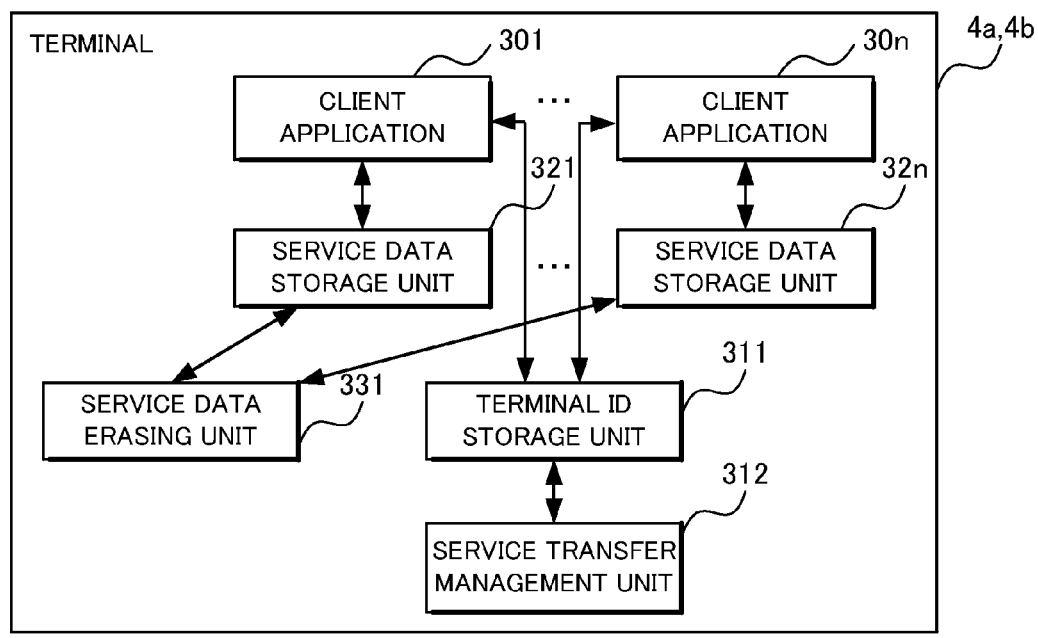
FIG. 10 is a block diagram showing a structure of a terminal according to a second exemplary embodiment of the present invention.

With reference to FIG. 10, the terminal 4a as a transferring source and the terminal 4b as a transferring destination in the second exemplary embodiment each include client applications 301 to 30n which connect to the service servers 21-2n to provide a user with service, service data storage units 321 to 32n for holding, in a terminal, service data to be used when each client application provides service, a terminal ID storage unit 311 which holds an ID applied to each terminal, a service transfer management unit 312 which executes processing of transferring service between the terminals, and a service data erasing unit 331 which erases service data stored in the service data storage units 321 to 32n.

Similarly to the first exemplary embodiment, in a case of service using a Web browser, the Web browser is equivalent to the client applications 301 to 30n. The service data held in the service data storage units 321 to 32n includes information related to products in a shopping cart in a case of on-line-shopping service and information related to items owned in a case of on-line game, for example, and includes at least a session ID in any case.

In the present exemplary embodiment, the client applications 301 to 30n operative on the terminals 4a and 4b read and write data stored in their corresponding service data storage units 321 to 32n, as well as providing a user with service while appropriately communicating with the service servers 21 to 2n.

The service transfer management unit 312 of each of the terminals 4a and 4b communicates with the service transfer management unit 312 of a terminal as a transfer destination to obtain a terminal ID of the other party and further transmits the obtained terminal ID and its own terminal ID to the transfer management server 10 to notify service transfer, thereby executing processing of transferring service between terminals.

Operation of the Second Exemplary Embodiment

Next, entire operation of the present exemplary embodiment will be detailed with reference to FIG. 1, FIG. 10, FIG. 7 and the flow chart of FIG. 11. The terminals 3a and 3b in FIG. 1 and FIG. 7 are assumed to be read as the terminals 4a and 4b.

Since the procedure of first operating the terminal 4a to use service by a user is the same as that of the first exemplary embodiment shown in FIG. 8, no description will be made thereof.

Here, description will be made of operation to be executed when service used by the terminal 4a is transferred to the terminal 4b as a transferring destination with reference to FIG. 11.

Figure 11:
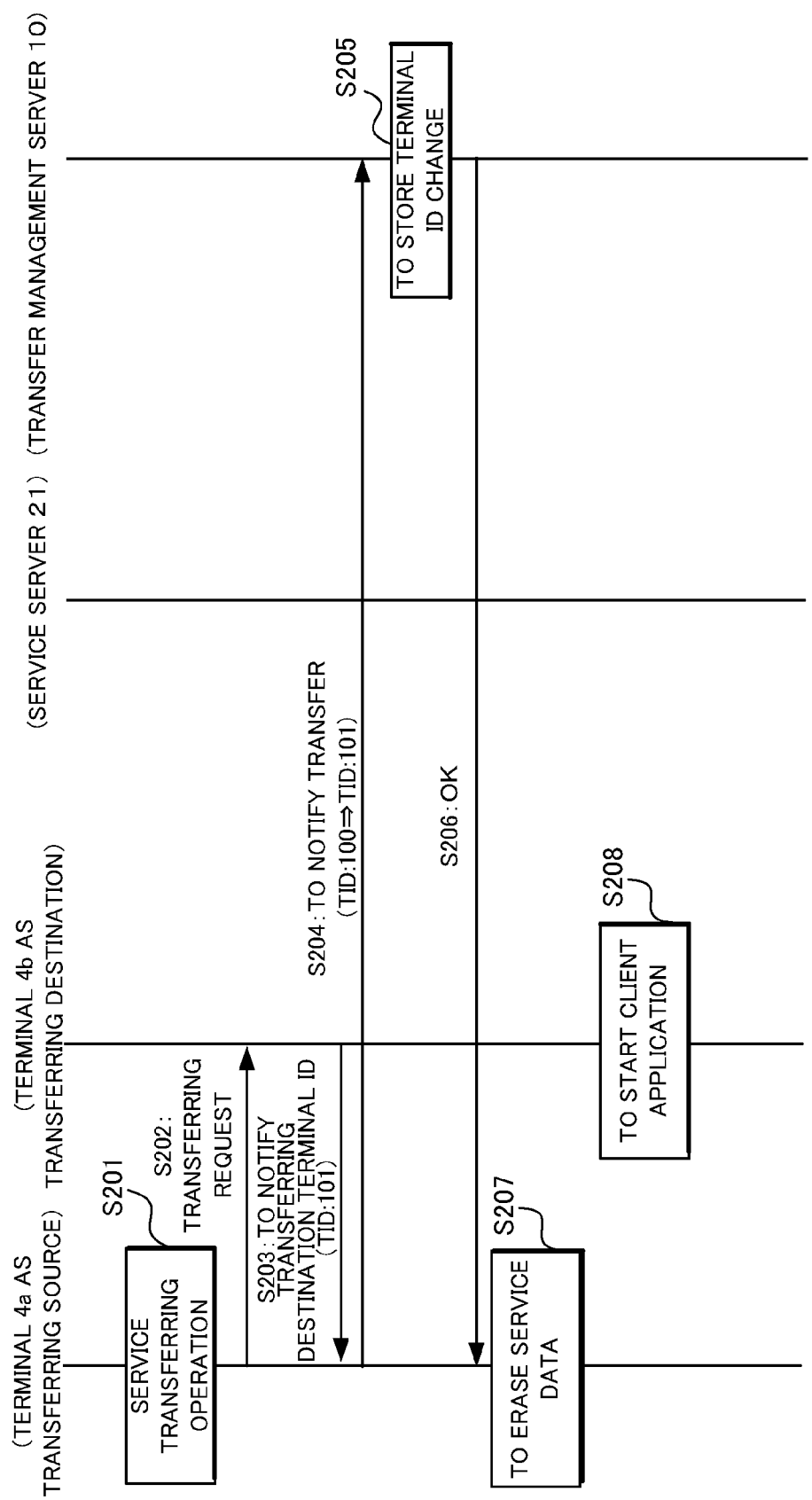
FIG. 11 is a flow chart showing operation according to the second exemplary embodiment.

The user operates the terminal 4a as the transferring source to execute service transferring operation (Step S201 in FIG. 11). Then, the service transferring management unit 312 of the terminal 4a as a transferring source communicates with the service transfer management unit 312 of the terminal 4b as a transferring destination to obtain a terminal ID (TID: 101) of the terminal 4b as a transferring destination (Steps S202 and S203).

Then, the service transfer management unit 312 of the terminal 4a notifies the transfer management server 10 of service transfer with the obtained terminal ID (TID: 101) of the terminal 4b as the transferring destination and its own terminal ID (TID: 101) as arguments (Step S204).

The transfer management unit 113 of the transfer management server 10 records, in the terminal change information storage unit 112, information that the service is transferred from the terminal 4a (TID: 100) to the terminal 4b (TID: 101) as the terminal change information 904 (Step S205) and returns a notification of recording completion to the terminal 3a (Step S206).

Furthermore, the service data erasing unit 331 of the transferring source terminal 4a operates all the service data storage units 321 to 32n of the transferring source terminal 4a to erase the stored service data (Step S207).

In place of directly operating the service data storage units 321 to 32n to erase service data by the service data erasing unit 331, the following method will be possible. For example, the service data erasing unit 331 requests the client applications 301 to 30n for erasing service data. Then, the client applications 301 to 30n operate the service data storage units 321 to 32n corresponding to the respective requests to erase the service data.

Thereafter, the user operates the terminal 4b as the transferring destination to start the client application 301, for example (Step S208), and the operation to follow is the same as that after Step S121 in FIG. 9 showing the procedure of the first exemplary embodiment, detailed description of which will be therefore omitted.

Effects of the Second Exemplary Embodiment

In addition to the above-described effects of the first exemplary embodiment, the second exemplary embodiment obtains the following effect.

When a user operates the terminal 4a as a transferring source by mistake to continue the use after service transferring operation, a session ID is transmitted from the client application to the service servers 21 to 2n and the service server executes any of the processing to change a state of the service server side. When the state of the service servers 21 to 2n is thus changed from a time point of execution of the service transferring operation, the terminal 4b as the transferring destination might fail to normally continue the service.

According to the present exemplary embodiment, however, because service data is erased on the terminal 4a as the transferring source when the user executes service transferring operation, no session ID will be transmitted to the service server even when the user tries to continue use of the service at the terminal as a transferring source by mistake after service transferring operation. State of the service server side will therefore have no change to enable the terminal 4b as the transferring destination to normally continue service.

Third Exemplary Embodiment

Next, a third exemplary embodiment of the present invention will be detailed with reference to the drawings.

A system according to the third exemplary embodiment has a structure which includes the transfer management server 10, one or a plurality of service servers 21 to 2n, a terminal 5a as a transferring source and a terminal 5b as a transferring destination, which is different from the second exemplary embodiment only in the structures of the transferring source terminal 5a and the transferring destination terminal 5b.

Figure 12:
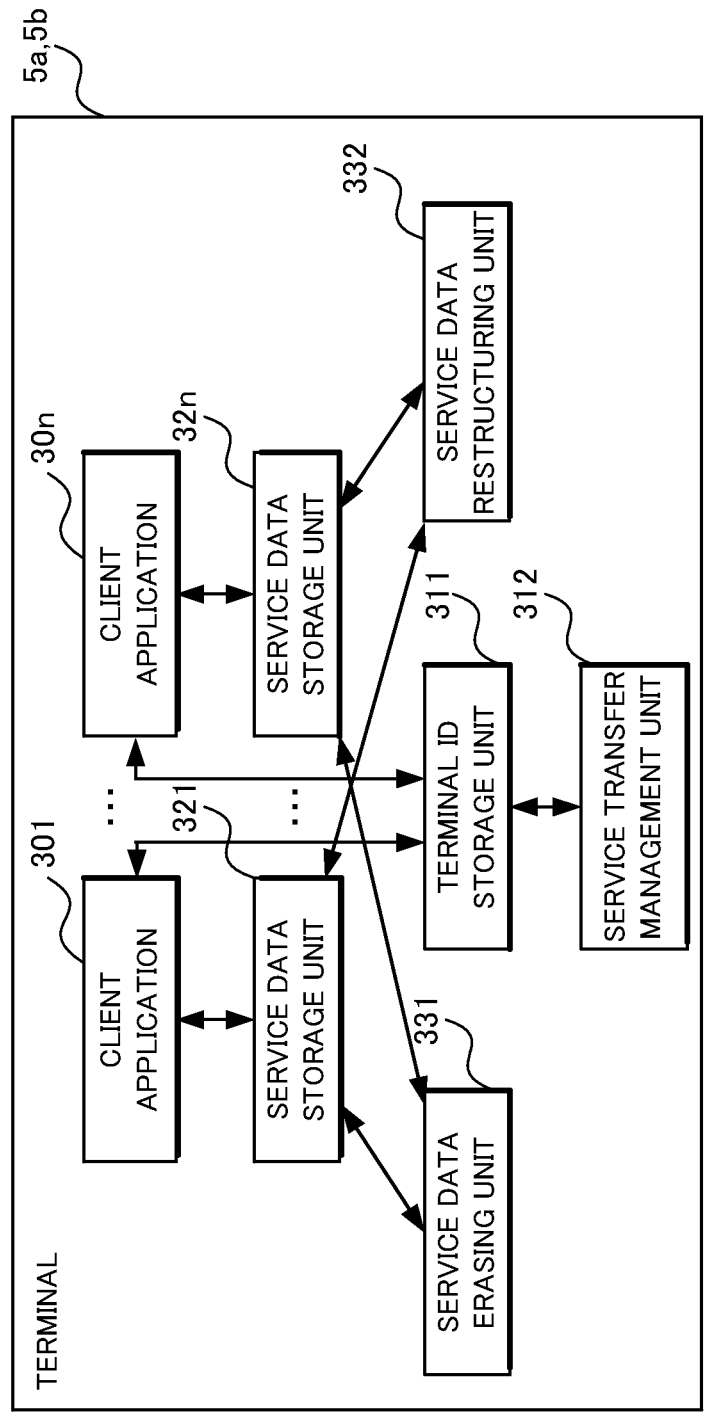
FIG. 12 is a block diagram showing a structure of a terminal according to a third exemplary embodiment of the present invention.

With reference to FIG. 12, the terminal 5a as a transferring source and the terminal 5b as a transferring destination in the third exemplary embodiment each further include a service data restructuring unit 332 as compared with the terminals 4a and 4b in the second exemplary embodiment.

In the present exemplary embodiment, when a user starts any of the client applications 301 to 30n at the transferring destination terminal 5b after the service is transferred from the transferring source terminal 5a to the transferring destination terminal 5b, the service data restructuring unit 332 of the transferring destination terminal 5b reconstructs service data stored in the corresponding service data storage unit among the service data storage units 321 to 32n.

Operation of the Third Exemplary Embodiment

Operation of the present exemplary embodiment will be detailed with reference to the flow chart of FIG. 13.

Since the procedure of first operating the transferring source terminal 5a to use service by the user is the same as that of the first exemplary embodiment described with reference to FIG. 8, no description will be made thereof.

Figure 13:
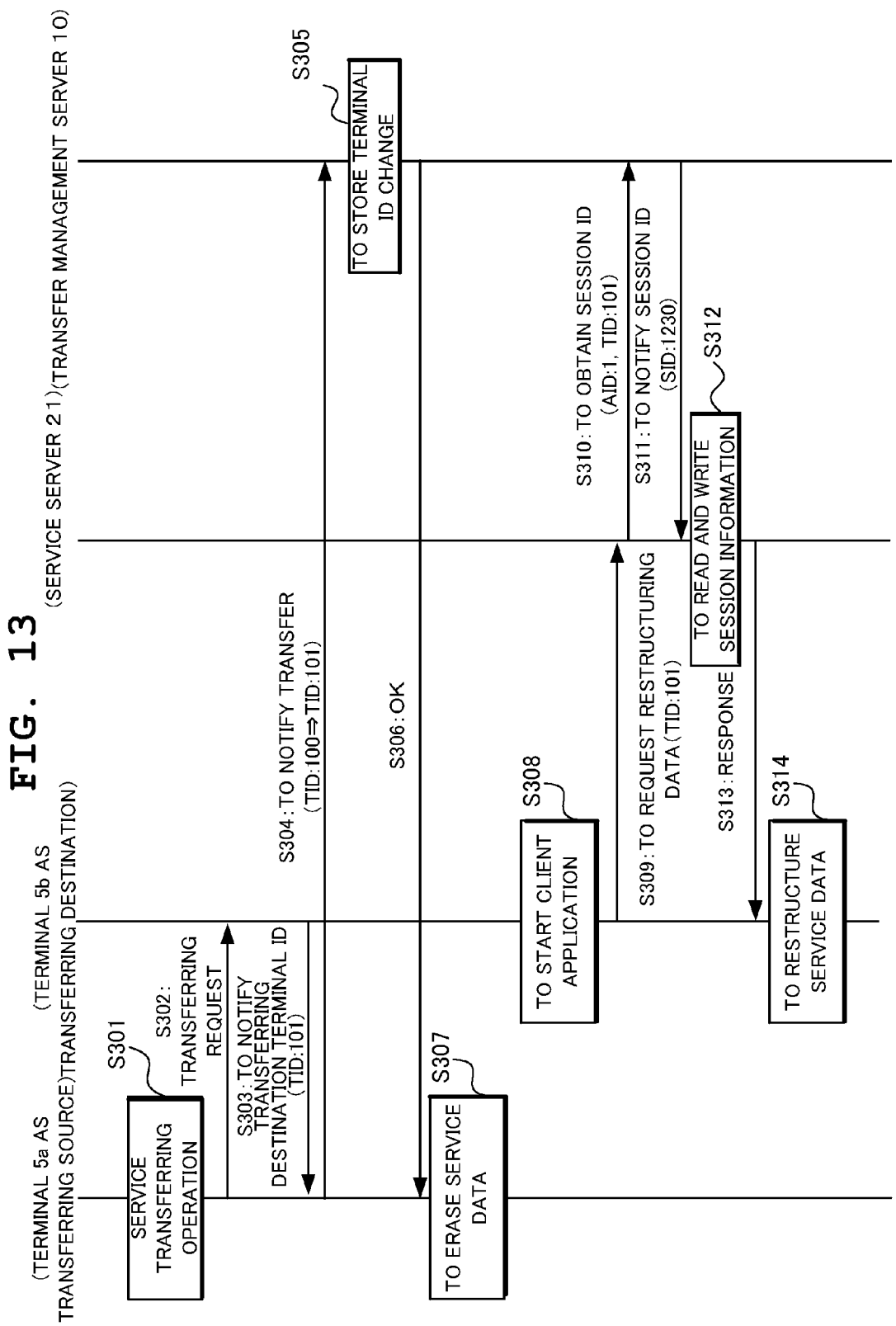
FIG. 13 is a flow chart showing operation according to the third exemplary embodiment.

At the time of transferring service used at the terminal 5a to the terminal 5b as a transferring destination, the user operates the transferring source terminal 5a to execute service transferring operation (Step S301 in FIG. 13). The procedure hereafter until start of one of client applications (e.g. the client application 301) at the transferring destination terminal 5b by the user (Step S308) is the same as the procedure (Steps S201 to S208) of the second exemplary embodiment shown in FIG. 11.

When the user starts the client application 301, the service data restructuring unit 332 of the transferring destination terminal 5b requests the service server 21 for data necessary for restructuring service data used by the transferring source terminal 5a with its own terminal ID (TID: 101) as an argument (Step S309).

The service server 21 obtains a session ID from the transfer management server 10 (Steps S310 and S311) and while writing and reading session information as required (Step S312), returns information necessary for restructuring service data of the service data storage unit 321 of the transferring destination terminal 5b to the transferring destination terminal 5b (Step S313).

The service data restructuring unit 332 of the transferring destination terminal 5b executes restructuring of service data of the service data storage unit 321 based on the data returned from the service server 21 (Step S314). Since operation to be executed after the restructuring is completed is the same as the operation after Step S121 or Step S126 in FIG. 9 which shows the procedure of the first exemplary embodiment, no detailed description will be made thereof.

In place of directly restructuring the service data in the service data storage units 321 to 32n by the service data restructuring unit 332, the service data restructuring unit 332 may request the client applications 301 to 30n for restructuring the service data and the client applications 301 to 30n may reconstruct the service data in the service data storage units 321 to 32n.

Effects of the Third Exemplary Embodiment

In addition to the above-described effects of the first exemplary embodiment, the third exemplary embodiment obtains the following effect.

The service data storage unit of the terminal 5b as a transferring destination immediately after service transferring operation remains at an initial state. It is therefore necessary for a client application or a service application of a service server to constantly seize the state of the service data storage unit of a terminal and execute restructuring as required. Because service data of the transferring destination terminal 5b is automatically reconstructed by the service data restructuring unit, the present exemplary embodiment prevents processing of the client application or the service application of the service server from becoming complicated.

Fourth Exemplary Embodiment

Next, a fourth exemplary embodiment of the present invention will be detailed with reference to the drawings.

Figure 14:
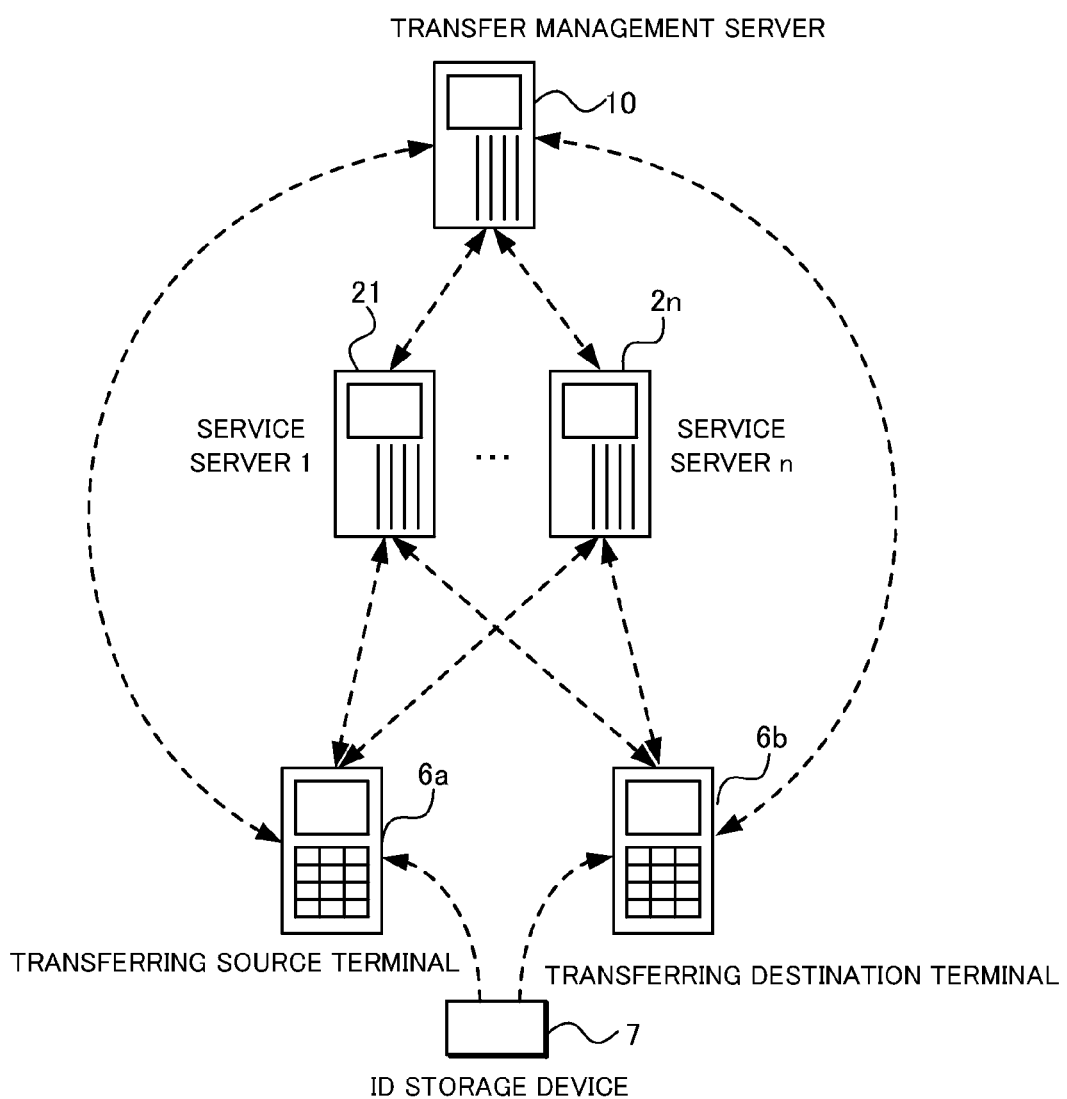
FIG. 14 is a block diagram showing a structure of a system according to a fourth exemplary embodiment of the present invention.

With reference to FIG. 14, a system according to the fourth exemplary embodiment has a structure which includes the transfer management server 10, one or a plurality of service servers 21 to 2n, a terminal 6a as a transferring source and a terminal 6b as a transferring destination, and an ID storage device 7. The system according to the fourth exemplary embodiment is different from the first exemplary embodiment shown in FIG. 1 only in the structures of the transferring source terminal 6a and the transferring destination terminal 6b, and employing the ID storage device 7.

Figure 15:
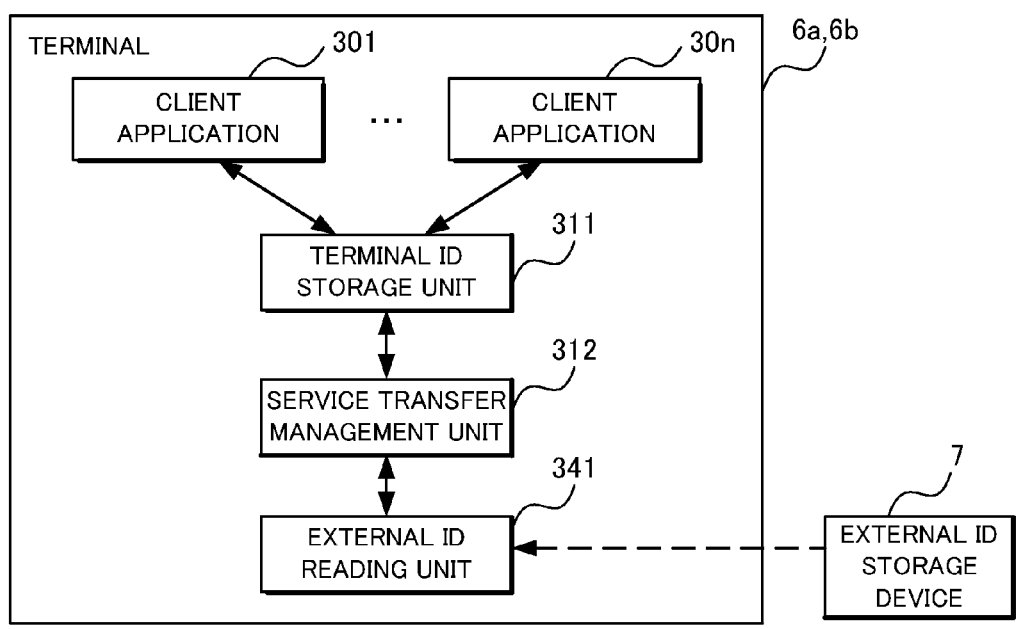
FIG. 15 is a block diagram showing a structure of a terminal according to the fourth exemplary embodiment.

With reference to FIG. 15, the terminal 6a as a transferring source and the terminal 6b as a transferring destination in the fourth exemplary embodiment each include the client applications 301 to 30n which connect to the service servers 21-2n to provide a user with service, the terminal ID storage unit 311 which holds an ID for each terminal, the service transfer management unit 312 which executes processing of transferring service between the terminals, and an external ID reading unit 341 which reads an ID from the ID storage device 7 outside the terminal.

In the present exemplary embodiment, the service transfer management unit 312 of the terminals 6a and 6b controls the external ID reading unit 341 to read an ID stored in the ID storage device 7 existing outside the terminals 6a and 6b, as well as communicating with the transfer management server 10 to execute processing of transferring service between the terminals.

The ID storage device 7 and the external ID reading unit 341 here are for use in correlating the terminal 6 as a transferring source and the terminal 6b as a transferring destination, which can be realized, for example, by an IC card on which an ID not overlapping with other ID is recorded and an IC card reader for reading the card. The ID storage device 7 and the external ID reading unit 341 can be realized also by an ID card to which a bar code representing non-overlapping ID is attached and a bar code reader for reading the card or the like. As an example of the IC card and the IC card reader described formally, used is, for example, a method of exchanging a SIM (Subscriber Identity Module) card of a cellular phone between two cellular phones, for example. In this case, the IC card reader (external ID reading unit 341) is provided in a terminal which is a cellular phone, and SIM is equivalent to the ID storage device 7.

Operation of the Fourth Exemplary Embodiment

Next, entire operation of the present exemplary embodiment will be detailed with reference to FIG. 14, FIG. 15, FIG. 7 and the flow chart of FIG. 16. The terminals 3a and 3b in FIG. 7 are assumed to be read as the terminals 6a and 6b.

Since the procedure of first operating the terminal 6a to use service by a user is the same as that of the first exemplary embodiment shown in FIG. 8, no detailed description will be made thereof.

Figure 16:
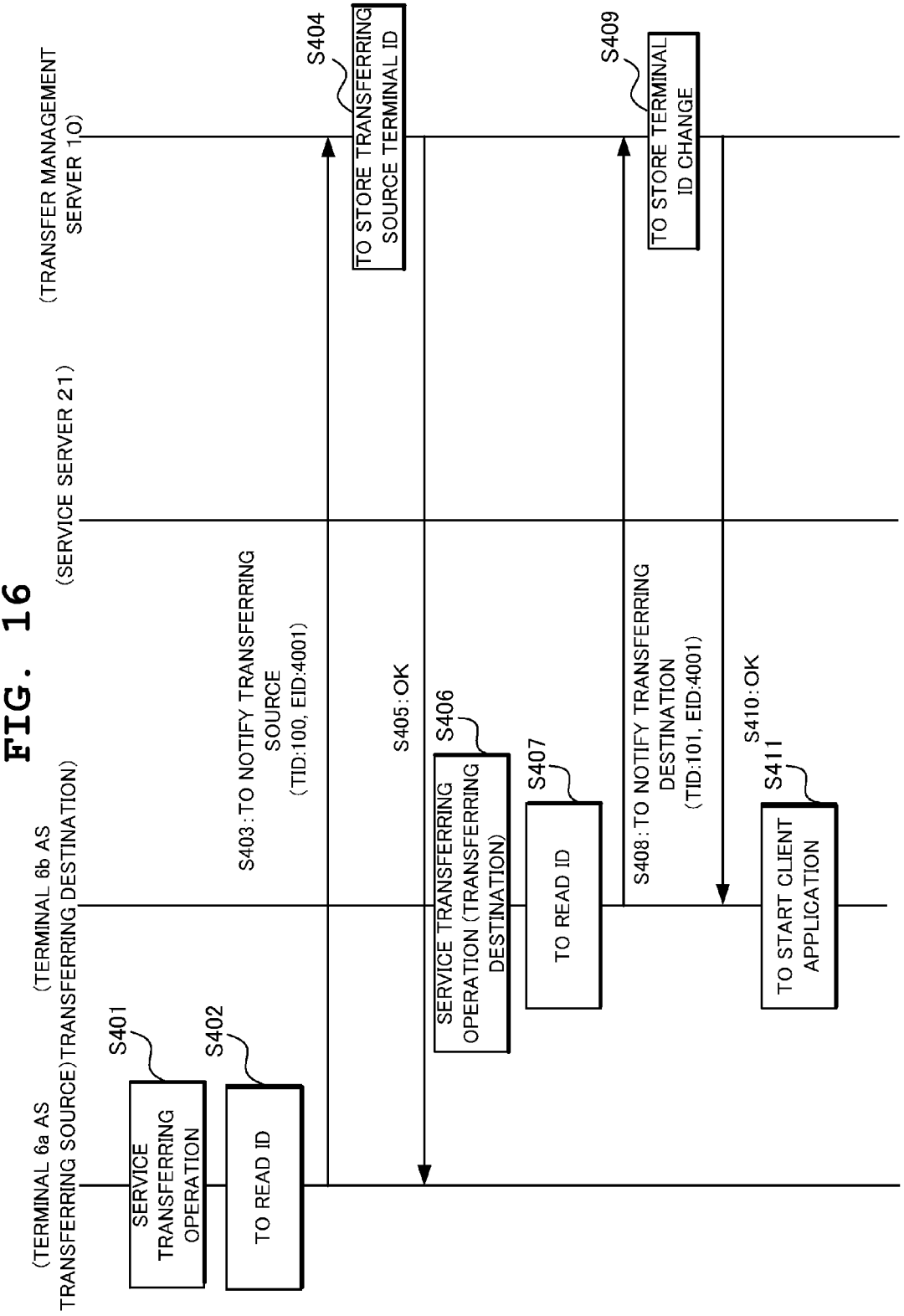
FIG. 16 is a flow chart showing operation according to the fourth exemplary embodiment.

At the time of transferring service used by the terminal 6a to the terminal 6b as a transferring destination, the user operates the terminal 6a as a transferring source to execute the first service transferring operation (Step S401 in FIG. 16). At this time, designate the terminal 6a as the transferring source.

The user operates the ID storage device 7 and the external ID reading unit 341 of the transferring source terminal 6a to execute operation of reading an external ID (assumed to be EID: 4001) from the ID storage device 7 (Step S402). Then, the service transfer management unit 312 of the transferring source terminal 6a notifies the transfer management server 10 of the transfer of the service and the terminal ID of the transferring source with its own terminal ID (TID: 100) and the read external ID (EID: 4001) as arguments (Step S403).

The transfer management unit 113 of the transfer management server 10 records a pair of the terminal ID (TID: 100) and the external ID (EID: 4001) in the terminal change information storage unit 112 (Step S404) to return a notification of recording completion to the terminal 6a (Step S405).

Thereafter, the user operates the transferring destination terminal 6b to execute the second service transferring operation (Step S406). At this time, designate the terminal in question as a transferring destination.

The user operates the same ID storage device 7 and ID reading unit 341 of the transferring terminal 6b as those described above to execute operation of reading the external ID (EID: 4001) from the ID storage device 7 (Step S407). Then, the service transfer management unit 312 of the transferring destination terminal 6b notifies the transfer management server 10 of the transfer of the service and the terminal ID of the transferring destination with its own terminal ID (TID: 101) and the read external ID (EID: 4001) as arguments (Step S408).

Since the pair of the external ID (EID: 4001) and TID: 100 is already recorded in the terminal change information storage unit 112, the transfer management unit 113 of the transfer management server 10 determines that the operation of transferring the service from TID: 100 to TID: 101 is executed and records, in the terminal change information storage unit 112, the pair of the terminal ID (TID: 101) and the external ID (EID: 4001) so as to correspond to the pair of the external ID (EID: 4001) and TID: 100 (Steps S409 and S410).

Thereafter, the user operates the transferring destination terminal 6b to start the client application 301, for example (Step S411), and since operation hereafter is the same as the operation executed after Step S121 in FIG. 9 which shows the procedure of the first exemplary embodiment, no detailed description will be made thereof.

While in the above-described first and second service transferring operation, the user is assumed to also designate a terminal as a transferring source or a transferring destination, the user's designation can be omitted by determining, for example, that a terminal which first reads an external ID from the ID storage device 7 to communicate with the transfer management server 10 is a terminal as a transferring source and a terminal which later reads the external ID to communicate with the transfer management server 10 is a terminal as a transferring destination.

Effects of the Fourth Exemplary Embodiment

In addition to the above-described effects of the first exemplary embodiment, the fourth exemplary embodiment obtains the following effect.

In the fourth exemplary embodiment, as long as the terminals 6a and 6b comprise the external ID reading unit 341 such as an IC card reader or a camera, transfer of a plurality of services between the terminals can be completed by one operation even without a communication unit which executes interactive communication between terminals such as wireless LAN or infrared communication.

Fifth Exemplary Embodiment

Next, a fifth exemplary embodiment of the present invention will be detailed with reference to the drawings.

A system according to the fifth exemplary embodiment has a structure which includes the transfer management server 10, one or a plurality of service servers 21 to 2n, a terminal 7a as a transferring source and a terminal 7b as a transferring destination. The system according to the fifth exemplary embodiment is different from the first exemplary embodiment shown in FIG. 1 in notifying a transfer from the terminal 7a as a transferring source not to the transfer management server 10 but to the service server and in failing to comprise the terminal change information storage unit 112 in the transfer management server 10.

Figure 17:
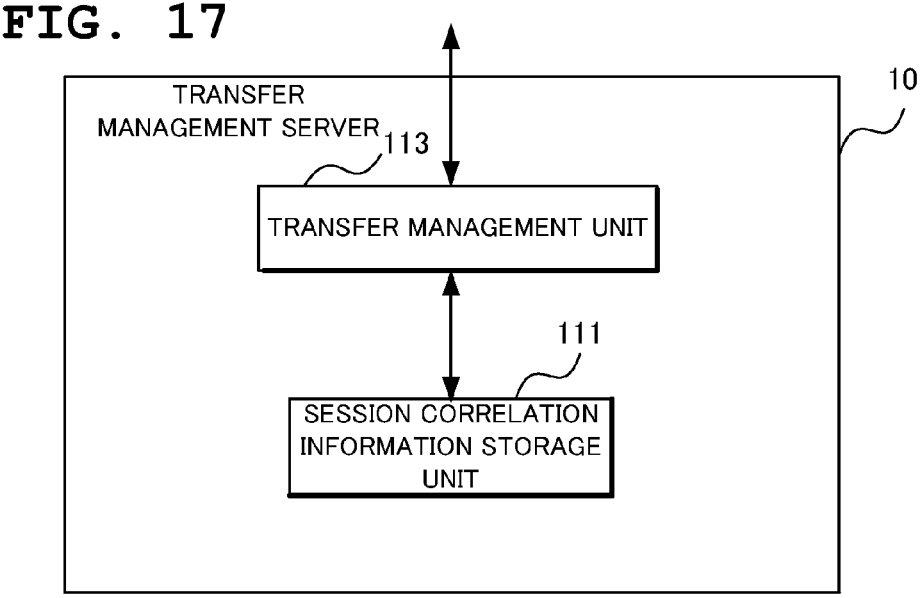
FIG. 17 is a block diagram showing a structure of a transfer management server according to a fifth exemplary embodiment.

Since the structures of the terminal 7a as a transferring source and the terminal 7b as a transferring destination and the structure of the service servers 21 to 2n are the same as those of the first exemplary embodiment, no description will be made thereof. As shown in FIG. 17, the transfer management server 10 comprises the session correlation information storage unit 111 and the transfer management unit 113.

In the present exemplary embodiment, the service transfer management unit 312 of the terminals 7a and 7b communicates with the service transfer management unit 312 of a terminal as a transferring destination to obtain a terminal ID of the other party and transmits the obtained terminal ID and its own terminal ID to the service servers 21 to 2n to notify service transfer, thereby realizing service transfer between the terminals.

Operation of the Fifth Exemplary Embodiment

Figure 18:
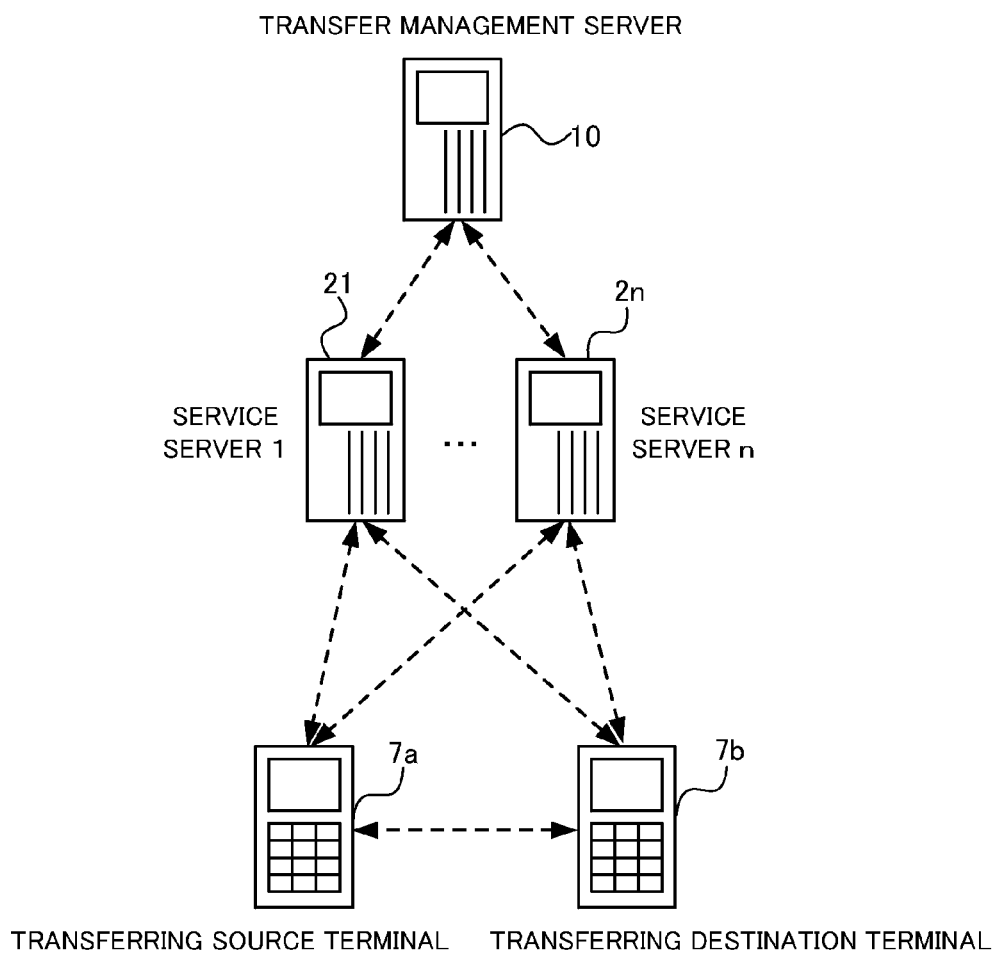
FIG. 18 is a block diagram showing a structure of a system according to the fifth exemplary embodiment.

Next, entire operation of the present exemplary embodiment will be detailed with reference to FIG. 7, FIG. 18 and the flow chart of FIG. 19.

Since the procedure of first operating the terminal 7a to use service by a user is the same as that of the first exemplary embodiment shown in FIG. 8, no description will be made thereof.

Here, description will be made of operation to be executed when service used by the terminal 7a is transferred to the terminal 7b as a transferring destination with reference to FIGS. 18 and 19.

Figure 19:
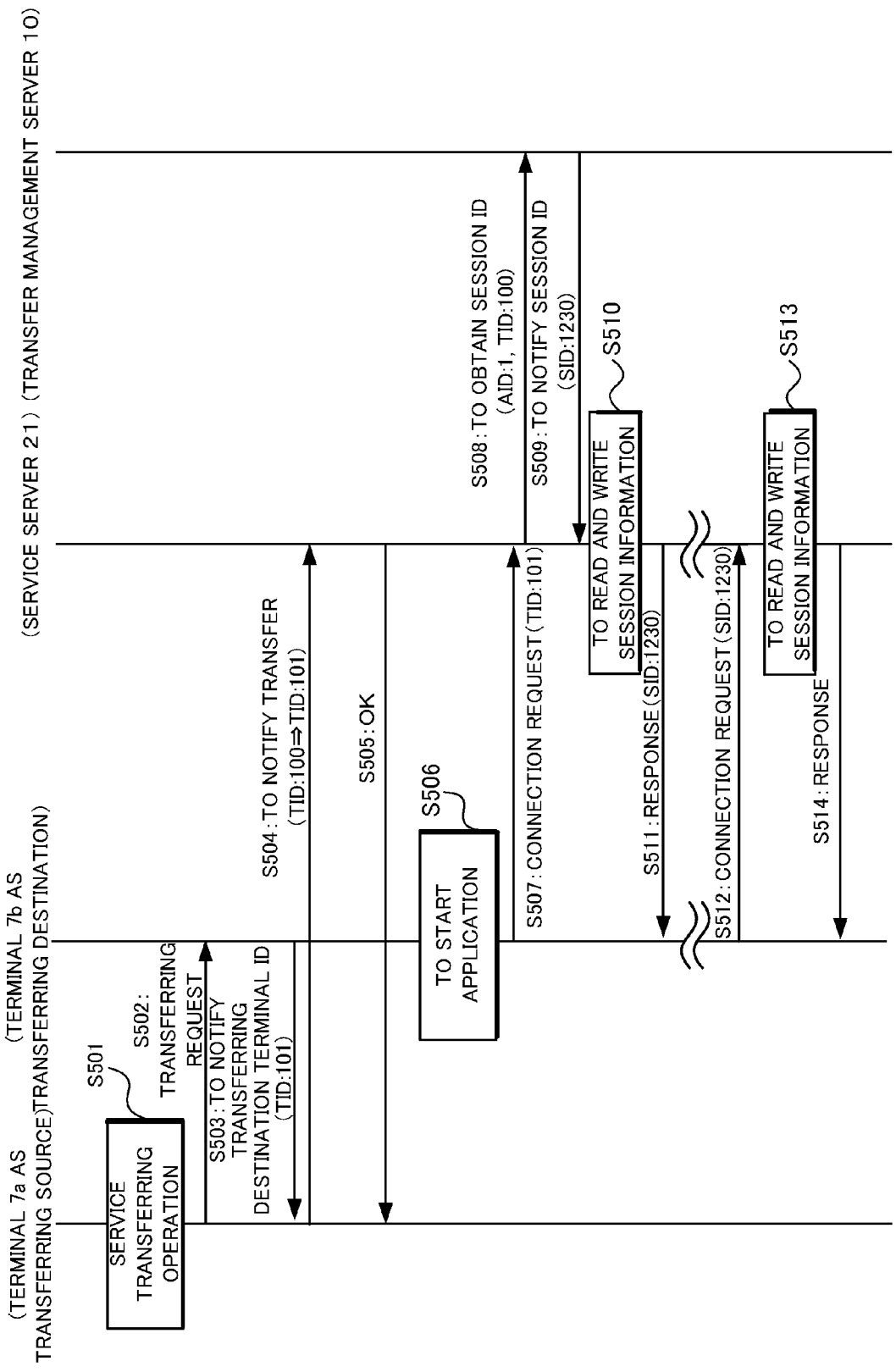
FIG. 19 is a flow chart showing operation according to the fifth exemplary embodiment.

First, the user operates the terminal 7a as the transferring source to execute service transferring operation (Step S501 in FIG. 19). Then, the service transfer management unit 312 of the terminal 7a as a transferring source communicates with the service transfer management unit 312 of the terminal 7b as a transferring destination to obtain a terminal ID (TID: 101) of the terminal 7b as the transferring destination (Steps S502 and S503).

Then, the service transfer management unit 312 of the terminal 7a notifies service transfer to the service server 21 being used with the obtained terminal ID (TID: 101) of the terminal 3b as the transferring destination and its own terminal ID (TID: 100) as arguments (Step S504). As shown in FIG. 18, in the present exemplary embodiment, service transfer is not notified to the transfer management server 10 from the terminal 7a as the transferring source but is directly notified to the service server 21.

The service server 21 returns, to the terminal 7a, a notification that a notification of service transfer from the terminal 7a (TID: 100) to the terminal 7b (TID: 101) is received (Step S505).

Thereafter, when the user operates the terminal 7b as the transferring destination to start the client application 301, for example (Step S506), the client application 301 makes a connection request to the service server 21 with the terminal ID (TID: 101) as an argument (Step S507).

Since the service server 21 is notified that as to the transmitted terminal ID (TID: 101), the terminal ID of the terminal 7a as of before transferring is TID: 100, it connects to the transfer management server 10 in order to obtain a session ID corresponding to its own application ID (AID: 1) and the terminal ID (TID: 100) (Step S508).

The transfer management unit 113 of the transfer management server 10 refers to the session correlation information 901 (set of AID: 1, TID: 100, SID: 1230) to determine that a session ID related to AID: 1 and TID: 100 is SID: 1230 and returns the session ID (SID: 1230) to the service server 21 (Step S509).

Thereafter, for executing processing necessary for providing service, the service server 21 reads session information corresponding to the obtained session ID from the session information storage unit 211 (Step S510) and lastly returns a response together with the session ID (SID: 1230) to the terminal 7b (Step S511). The terminal 7b executes such necessary processing as screen display based on the response.

Operation to be executed when the user further operates the terminal 7b to cause another need for connection to the service server 21 is the same as that after Step S126 in FIG. 10 showing the procedure of the first exemplary embodiment, detailed description of which will be therefore omitted.

Although the terminal 7a as the transferring source notifies the service server of the transfer at Step S504, the terminal 7b as the transferring destination may execute notification. For this arrangement, the terminal 7b as the transferring destination needs to obtain the terminal ID of the terminal 7a as the transferring source at Steps S502 and 503.

Effects of the Fifth Exemplary Embodiment

According to the fifth exemplary embodiment, it is possible to obtain the same effects as those by the above-described first exemplary embodiment, as well as eliminating the need of the terminal change information storage unit 112 on the transfer management server 10 side to simplify the structure of the transfer management server 10.

In addition, since it is designed to notify the service servers 21 to 2n of service transfer, the service servers 21 to 2n side is allowed to more clearly recognize service transfer between terminals, so that security in service transfer between the terminals can be maintained.

Sixth Exemplary Embodiment

Next, a sixth exemplary embodiment of the present invention will be detailed with reference to the drawings.

Figure 20:
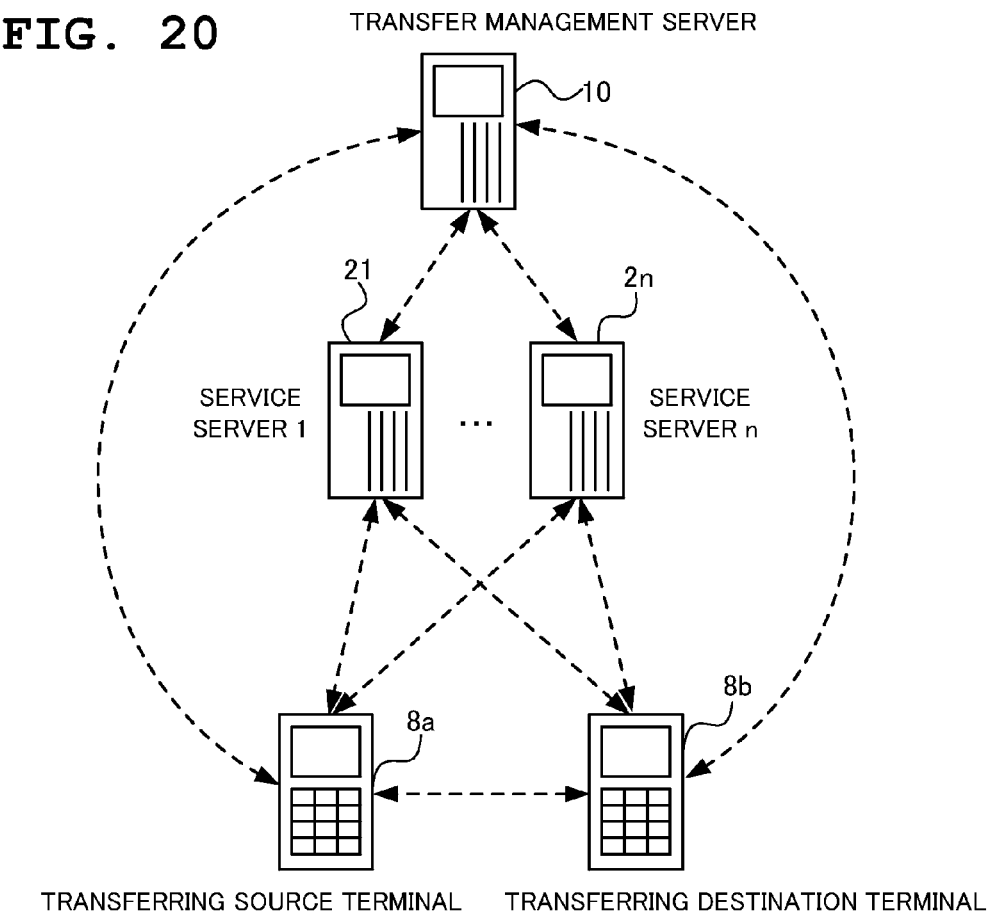
FIG. 20 is a block diagram showing a structure of a system according to a sixth exemplary embodiment.

With reference to FIG. 20, a system according to the sixth exemplary embodiment has a structure which includes the transfer management server 10, one or a plurality of service servers 21 to 2n, a terminal 8a as a transferring source and a terminal 8b as a transferring destination. The system according to the sixth exemplary embodiment is different from the first exemplary embodiment shown in FIG. 1 in the structures of the terminal 8a as a transferring source and the terminal 8b as a transferring destination.

Figure 21:
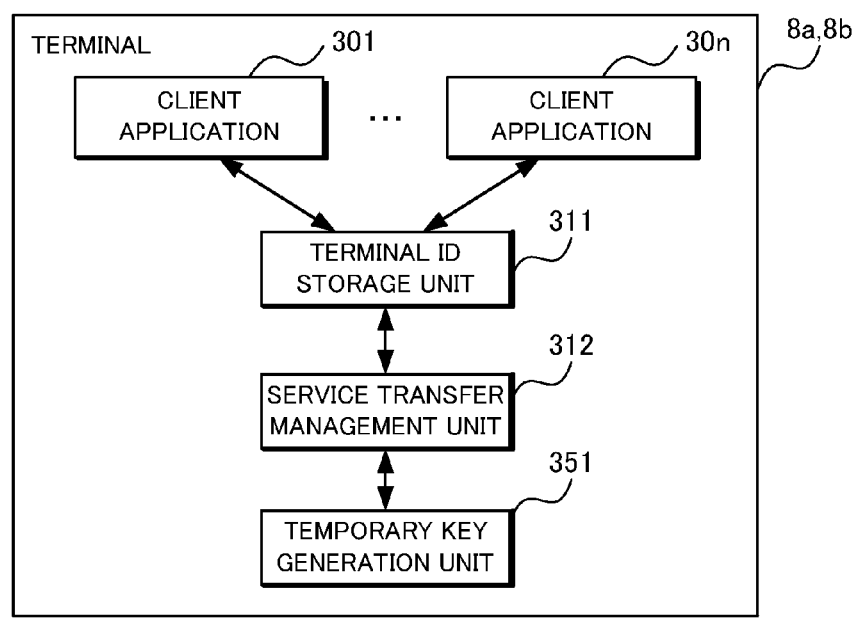
FIG. 21 is a block diagram showing a structure of a terminal according to the sixth exemplary embodiment.

With reference to FIG. 21, the transferring source terminal 8a and the transferring destination terminal 8b in the sixth exemplary embodiment each include the client applications 301 to 30n which connect to the service servers 21-2n to provide a user with service, the terminal ID storage unit 311 which holds an ID applied to each terminal, the service transfer management unit 312 which executes processing of transferring service between the terminals, and a temporary key generation unit 351 for generating a temporary key to be exchanged between a transferring source terminal and a transferring destination terminal.

In the present exemplary embodiment, the service transfer management unit 312 of the terminals 8a and 8b controls the temporary key generation unit 351 to generate a temporary key and exchanges the generated temporary key between the terminals 8a and 8b, as well as communicating with the transfer management server 10 to execute processing of transferring service between the terminals.

Since the temporary key generated by the temporary key generation unit 351 is here for use in correlating the terminal 8a as a transferring source and the terminal 8b as a transferring destination, it is desirably a key, for example, with an enough length and without bias which is generated by using a random number generator or the like so as not to overlap with a temporary key generated in other service transferring. Thus correlating terminals by using a temporary key is equivalent, in the fourth exemplary embodiment, to reading an ID recorded in the ID storage device 7 by the respective external ID reading units 341 of the terminal 6a as a transferring source and the terminal 6b as a transferring destination and correlating the terminal 6a and the terminal 6b by the transfer management server 10.

Operation of the Sixth Exemplary Embodiment

Next, entire operation of the present exemplary embodiment will be detailed with reference to FIG. 20, FIG. 21, FIG. 7 and the flow chart of FIG. 22. The terminals 3a and 3b in FIG. 7 are assumed to be read as the terminals 8a and 8b.

Since the procedure of first operating the terminal 8a to use service by a user is the same as that of the first exemplary embodiment shown in FIG. 8, no detailed description will be made thereof.

Figure 22:
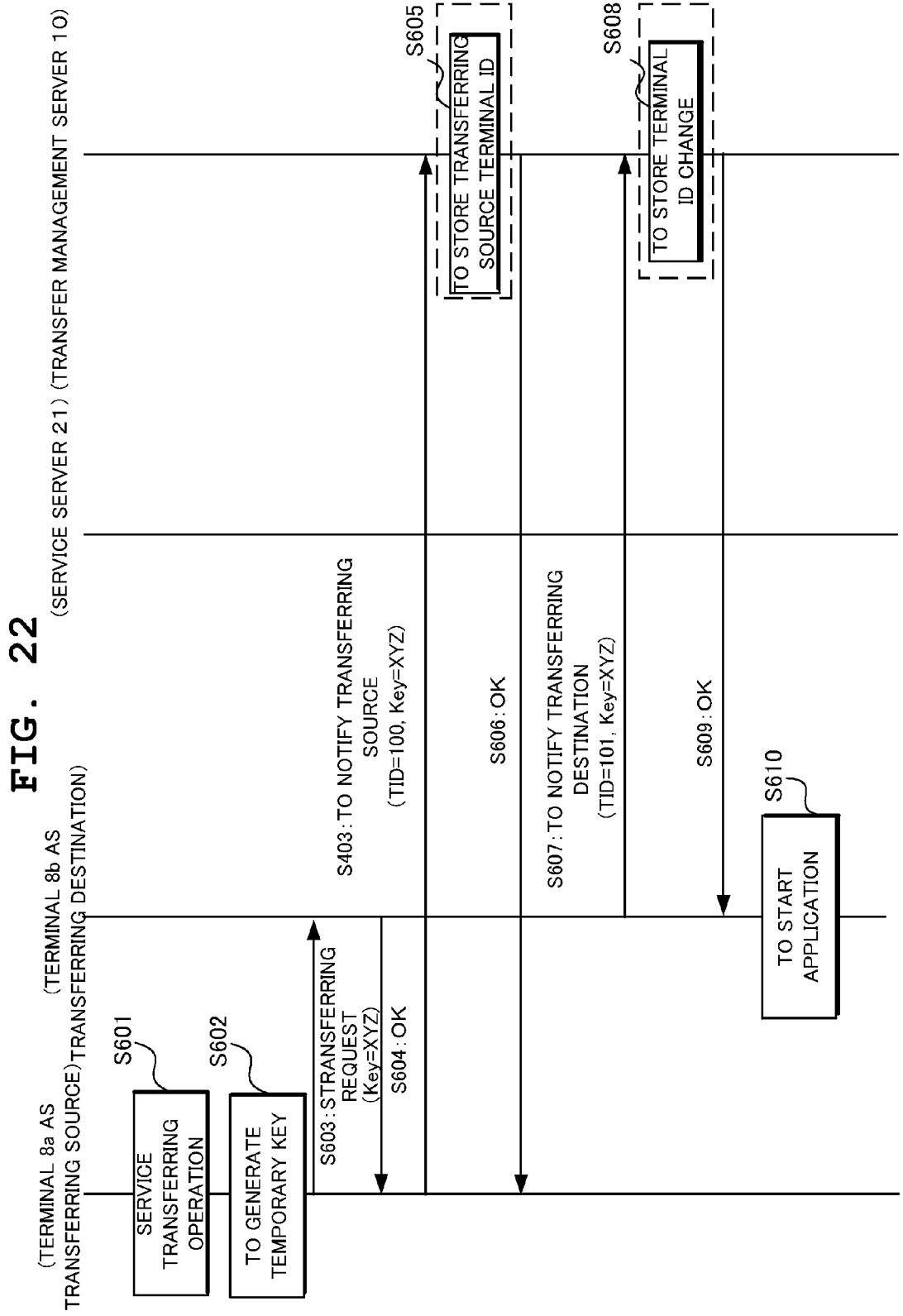
FIG. 22 is a flow chart showing operation according to the sixth exemplary embodiment.

At the time of transferring service used by the terminal 8a to the terminal 8b as a transferring destination, the user operates the terminal 8a as a transferring source to execute service transferring operation (Step S601 in FIG. 22). Then, the service transfer management unit 312 of the terminal 8a as the transferring source controls the temporary key generation unit 351 to generate a temporary key (assumed to be Key: XYZ) (Step S602) and further communicates with the service transfer management unit 312 of the terminal 8b as the transferring destination to transmit the generated temporary key (Steps S603 and S604).

Then, the service transfer management unit 312 of the terminal 8a designates the terminal 8a to be a transferring source and transmits the generated temporary key to the transfer management server 10 (Step S605).

The transfer management unit 113 of the transfer management server 10 records a pair of the terminal ID (TID: 100) and the temporary key (Key: XYZ) in the terminal change information storage unit 112 (Step S605) to return a notification of recording completion to the terminal 8a (Step S606).

After receiving the temporary key from the terminal 8a as a transferring source, the service transfer management unit 312 of the terminal 8b as a transferring destination designates the terminal 8b to be a transferring destination and transmits the generated temporary key to the transfer management server 10 (Step S607).

The transfer management unit 113 of the transfer management server 10 determines that the operation of transferring the service from TID: 100 to TID: 101 is executed from the fact that the pair of the temporary key (Key: XYZ) and TID: 100 is already recorded in the terminal change information storage unit 112 and records the pair of the terminal ID (TID: 101) and the temporary key (Key: XYZ) so as to correspond to the pair of the temporary key (Key: XYZ) and the TID: 100 in the terminal change information storage unit 112 (Steps S608 and S609).

Thereafter, although the user operates the transferring destination terminal 8b to start the client application 301, for example (Step S610), since operation hereafter is the same as the operation executed after Step S121 in FIG. 9 which shows the procedure of the first exemplary embodiment, no detailed description will be made thereof.

While the foregoing description is premised on that the terminal 8a as a transferring source communicates with the transfer management server 10 before the terminal 8b as a transferring destination does, it might be possible that the terminal 8b as a transferring destination conversely communicates with the transfer management server 10 before the terminal 8a as a transferring source does depending on a condition of a communication line. Even in such a case, since the terminal 8a and the terminal 8b notify the transfer management server 10 that they are a transferring source and a transferring destination, respectively, no effect will be exerted on the above-described processing of correlating two terminal IDs of a transferring source and a transferring destination based on a temporary key.

In addition, while the terminal 8a as a transferring source is assumed to generate a temporary key (Step S602), the key may be generated by the terminal 8b as a transferring destination. In this case, no temporary key is transmitted at Step S603, the terminal 8b generates a temporary key between Step S603 and Step S604 and the generated temporary key is transmitted to the terminal 8a at Step S604.

Moreover, while in the above-described service transferring operation, the user is assumed to operate a terminal as a transferring source to start service transferring operation, the user might conversely operate a terminal as a transferring destination to start service transferring operation.

Furthermore, although in the foregoing description, executed at Steps S603 and S604 is only the transmission of a generated temporary key from the terminal 8a as a transferring source to the terminal 8b as a transferring destination, terminal IDs of the respective terminals may be exchanged between the terminals at this time. At Steps S605 and S607, other terminal ID may be also transmitted to the transfer management server 10. This arrangement enables processing of collating the terminal as a transferring source and the terminal as a transferring destination to be executed reliably at Step S608.

Effects of the Sixth Exemplary Embodiment

In addition to the above-described effects of the first exemplary embodiment, the sixth exemplary embodiment obtains the following effect.

According to the first exemplary embodiment, after knowing a terminal ID of other user in advance, executing the processing starting at Step S117 in FIG. 9 through intentional rewriting of the terminal ID of the terminal ID storage unit 311 or through the use of a modified terminal so as to transmit a false terminal ID to the transfer management server 10 by a malicious user enables the malicious user to acquire service being used by the user in question in an unauthorized manner. According to the present exemplary embodiment, since a temporary key is exchanged between transferring source and transferring destination terminals and collated by the transfer management server 10, service acquisition by such a manner as described above is impossible to reduce risks in security.

Seventh Exemplary Embodiment

Next, a seventh exemplary embodiment of the present invention will be detailed with reference to the drawings.

Figure 23:
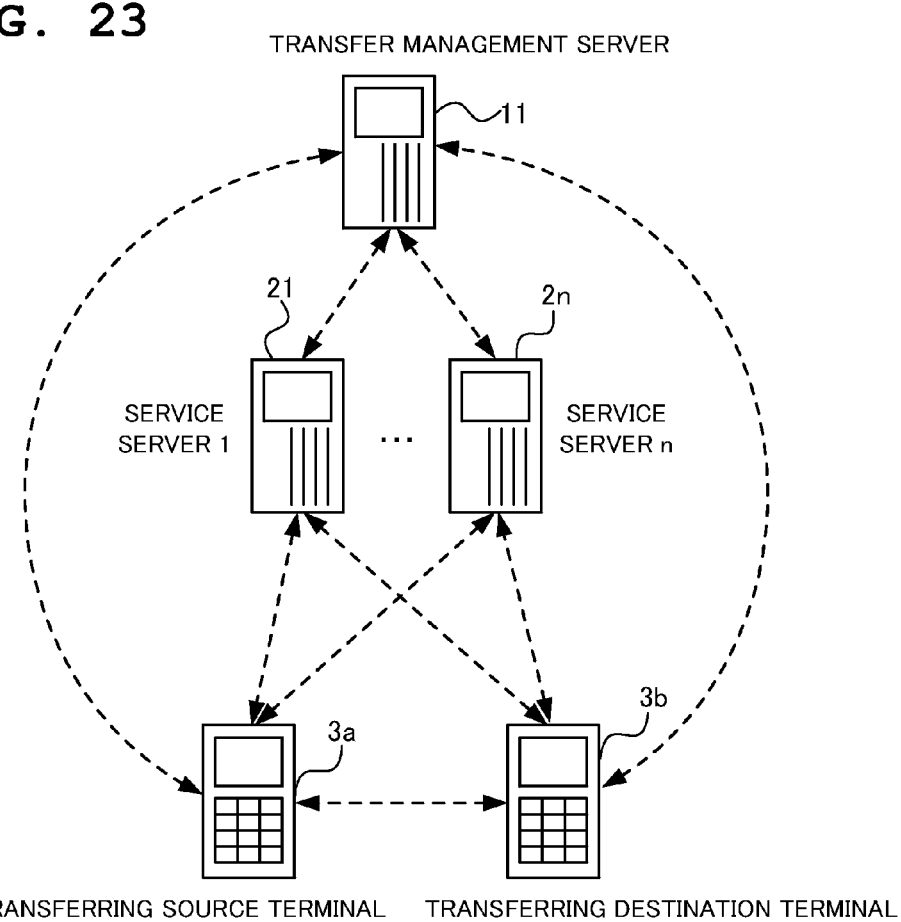
FIG. 23 is a block diagram showing a structure of a system according to a seventh exemplary embodiment.

With reference to FIG. 23, a system according to the seventh exemplary embodiment has a structure which includes a transfer management server 11, one or a plurality of service servers 21 to 2n, the terminal 3a as a transferring source and the terminal 3b as a transferring destination. The system according to the seventh exemplary embodiment is different from the first exemplary embodiment shown in FIG. 1 in the structure of the transfer management server 11.

Figure 24:
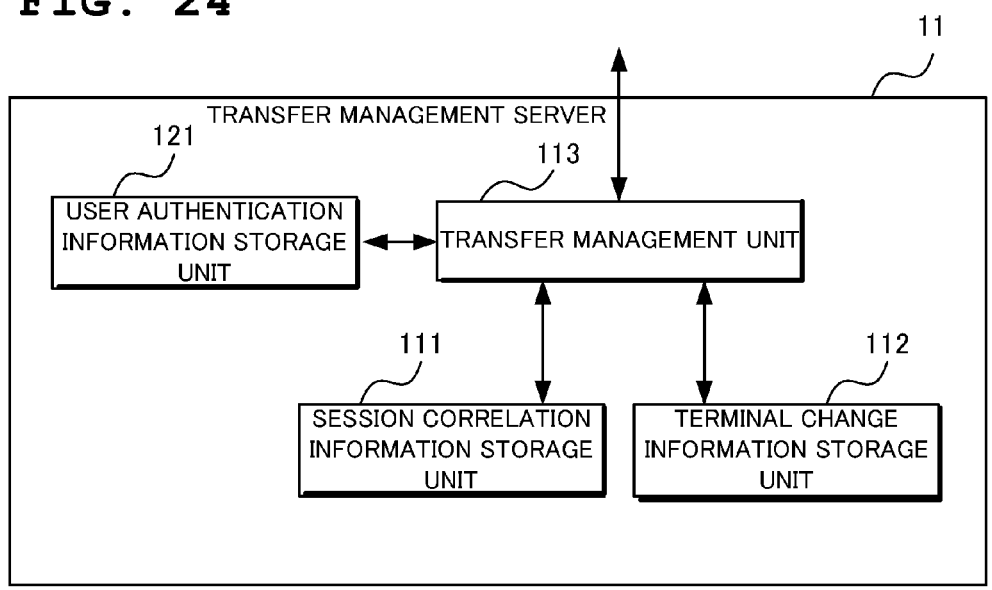
FIG. 24 is a block diagram showing a structure of a transfer management server according to the seventh exemplary embodiment.

With reference to FIG. 24, the transfer management server 11 according to the seventh exemplary embodiment includes the session correlation information storage unit 111, the terminal change information storage unit 112, the transfer management unit (transfer management application) 113 and a user authentication information storage unit 121. Although the user authentication information is service provided by the service servers 21 to 2n, which is not related to user authentication information commonly used and which is basically managed by a transfer management server independently, it may be the same as user authentication information used in the above-described service.

In the present exemplary embodiment, at the time of receiving a service transfer notification from the terminal 3a as a transferring source and the terminal 3b as a transferring destination, the transfer management server 11 requests each terminal for user authentication. Thus executing user authentication by the same user at both terminals, the terminal 3a as a transferring source and the terminal 3b as a transferring destination are correlated. This is equivalent, in the fourth exemplary embodiment, to reading an ID recorded in the ID storage device 7 by the respective external ID reading units 341 of the terminal 6a as a transferring source and the terminal 6b as a transferring destination and correlating the terminal 6a and the terminal 6b by the transfer management server 10.

Operation of the Seventh Exemplary Embodiment

Next, entire operation of the present exemplary embodiment will be detailed with reference to FIG. 23, FIG. 24, FIG. 7 and the flow chart of FIG. 25. The transfer management server 10 in FIG. 7 is assumed to be read as the transfer management server 11.

Since the procedure of first operating the terminal 3a to use service by a user is the same as that of the first exemplary embodiment shown in FIG. 8, no detailed description will be made thereof.

Figure 25:
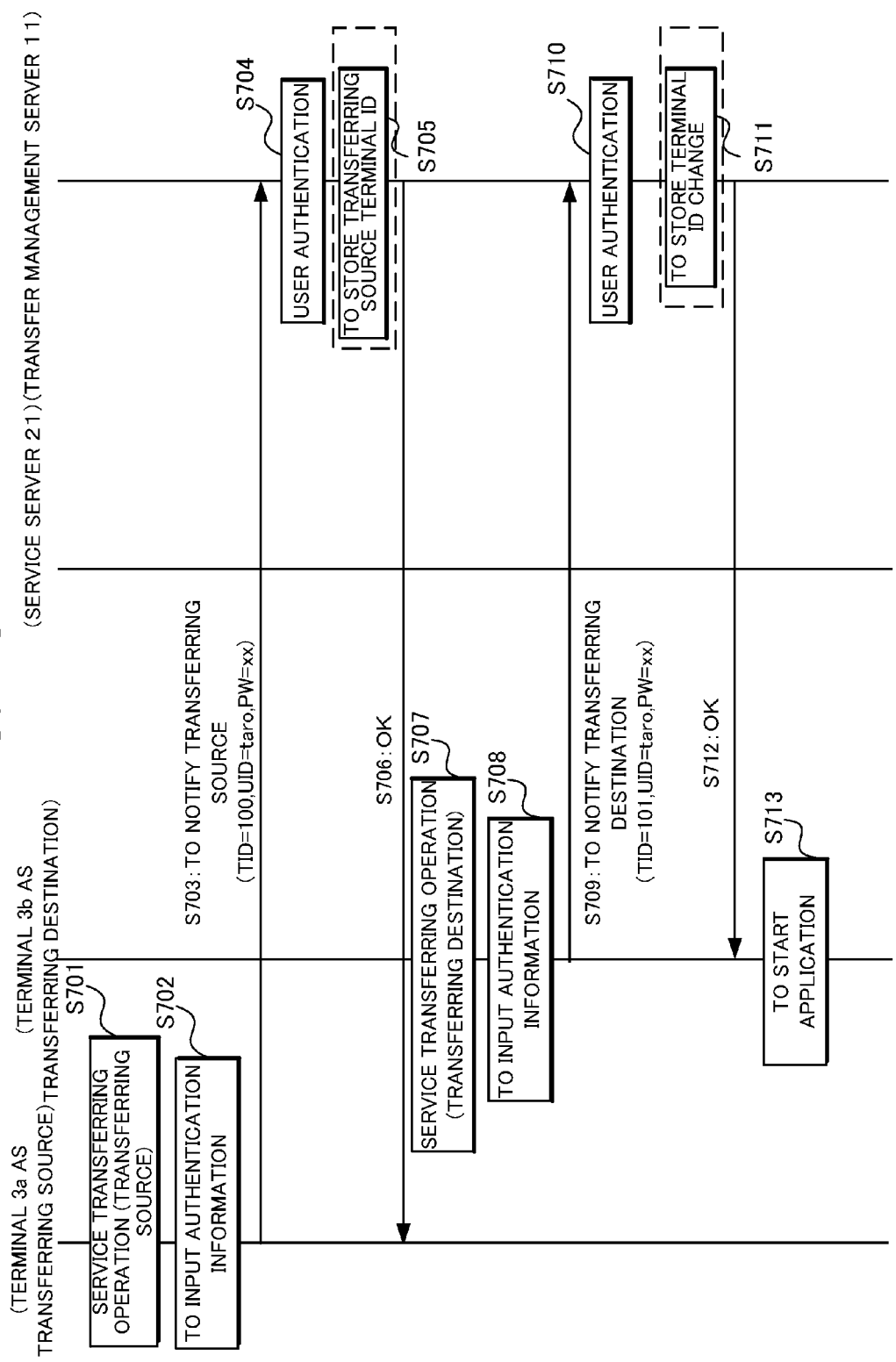
FIG. 25 is a flow chart showing operation according to the seventh exemplary embodiment.

At the time of transferring service used by the terminal 3a to the terminal 3b as a transferring destination, the user operates the terminal 3a as a transferring source to execute first service transferring operation (Step S701 in FIG. 25). At this time, designate the terminal 3a in question to be a transferring source.

The service transfer management unit 312 of the terminal 3a requests the user to input user authentication information such as a user ID and a password (Step S702). Upon input of the authentication information, the service transfer management unit 312 of the terminal 3a as a transferring source notifies the transfer management server 11 of service transfer and a terminal ID of the transferring source with its own terminal ID (TID: 100) and the input user authentication information (user ID and password) as arguments (Step S703).

The transfer management unit 113 of the transfer management server 11 refers to the user authentication information storage unit 121 based on the user authentication information received from the terminal 3*a* to execute user authentication (Step S704) and when authorized, records the user ID (UID: taro) and the terminal ID (TID: 100) in the terminal change information storage unit 112 (Step S705) to return a notification of recording completion to the terminal 3*a* (Step S706).

Thereafter, the user operates the transfer destination terminal 3*b* to execute second service transferring operation (Step S707). At this time, designate the terminal 3*b* as a transferring destination.

The service transfer management unit 312 of the terminal 3*b* requests the user to input user authentication information such as a user ID and a password as is executed in the foregoing (Step S708). Upon input of the user authentication information, the service transfer management unit 312 of the terminal 3*b* as a transferring destination notifies the transfer management server 11 of service transfer and the terminal ID of the transferring destination with its own terminal ID (TID: 101) and the input user authentication information as arguments (Step S709).

The transfer management unit 113 of the transfer management server 11 refers to the user authentication information storage unit 121 to execute user authentication based on the user authentication information received from the terminal 3*b* (Step S710). When authorized, determine that the operation of transferring the service from TID: 100 to TID: 101 is executed from the fact that the pair of UID: taro and TID: 100 is already recorded in the terminal change information storage unit 112 and record the pair of the user ID (UID: taro) and the terminal ID (TID: 101) so as to correspond to the pair of the user ID (UID: taro) and the TID: 100 in the terminal change information storage unit 112 (Steps S711 and S712).

Thereafter, the user operates the transferring destination terminal 3*b* to start the client application 301, for example (Step S713). Since operation hereafter is the same as the operation executed after Step S121 in FIG. 9 which shows the procedure of the first exemplary embodiment, no detailed description will be made thereof.

While in the foregoing first and second service transferring operation, it is assumed that the user also designates a terminal to be a transferring source or transferring destination terminal, it is possible to omit user's designation with a terminal which communicates with the transfer management server 11 first determined as a transferring source terminal and a terminal which communicates with the transfer management server 11 later determined as a transferring destination terminal.

In addition, while in the foregoing description, connection to the transfer management server 11 follows input of user authentication information to the transferring source terminal 3*a* or the transferring destination terminal 3*b* by the user, the transfer management server 11 may request the terminal 3*a* or the terminal 3*b* to input user authentication information after the terminal 3*a* or the terminal 3*b* connects to the transfer management server 11 similarly to common Web service.

Effects of the Seventh Exemplary Embodiment

In addition to the above-described effects of the first exemplary embodiment, the seventh exemplary embodiment obtains the following effect.

The seventh exemplary embodiment enables transfer of a plurality of services between terminals to be completed by one operation even when the terminals 3*a* and 3*b* fail to have a communication unit which executes interactive communication between terminals such as wireless LAN or infrared communication, or a special device such as an IC card reader or a camera.

Eighth Exemplary Embodiment

Next, an eighth exemplary embodiment of the present invention will be detailed with reference to the drawings.

Figure 26:
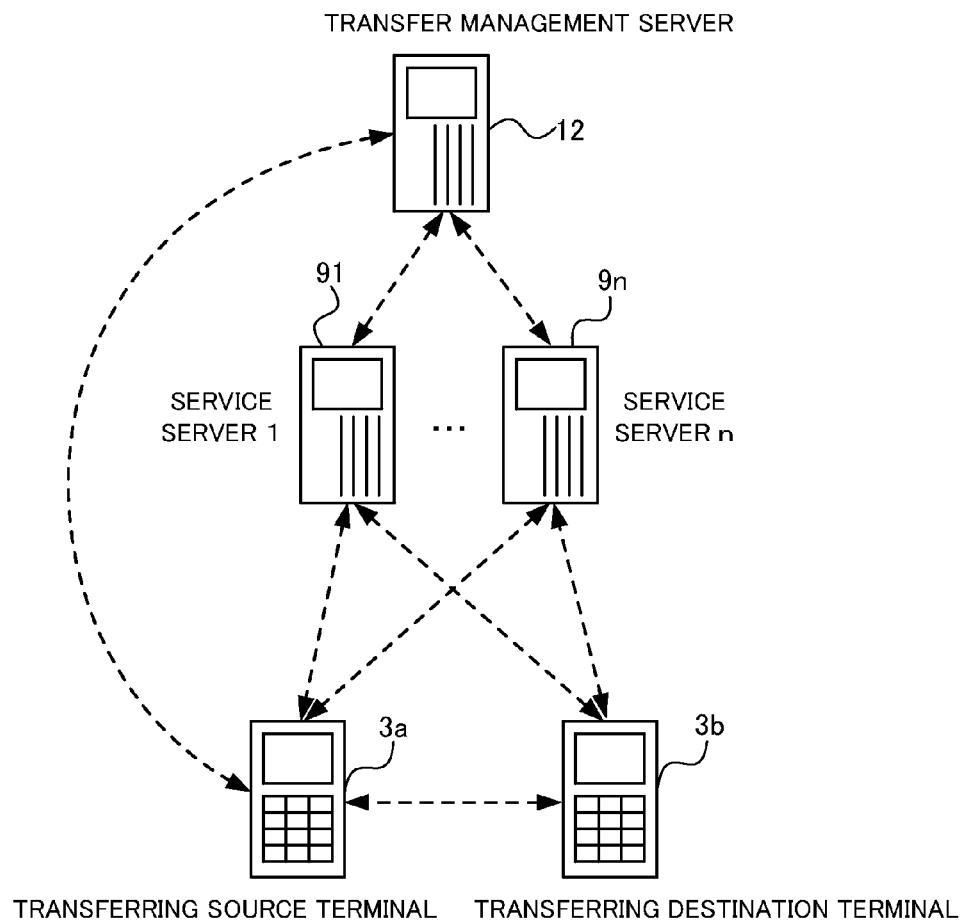
FIG. 26 is a block diagram showing a structure of a system according to an eighth exemplary embodiment.

With reference to FIG. 26, the system according to the eighth exemplary embodiment has a structure which includes a transfer management server 12, one or a plurality of service servers 91 to 9*n*, a terminal 3*a* as a transferring source and a terminal 3*b* as a transferring destination. The system according to the eighth exemplary embodiment is different from the first exemplary embodiment shown in FIG. 1 in the structures of the transfer management server 12 and the service servers 91 to 9*n*.

Figure 27:
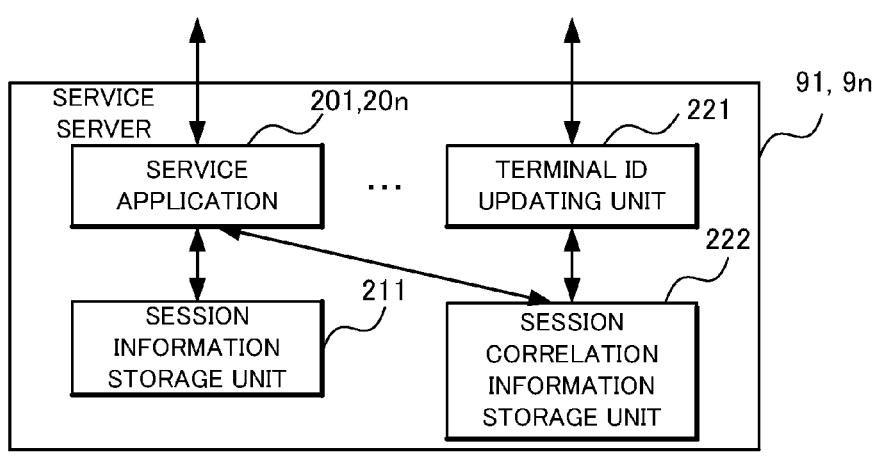
FIG. 27 is a block diagram showing a structure of a service server according to the eighth exemplary embodiment.

With reference to FIG. 27, the service servers 91 to 9*n* according to the eighth exemplary embodiment each include the service applications 201 to 20*n* which provide various kinds of services on a network, the session information storage unit 211, a terminal ID updating unit 221 and a session correlation information storage unit 222.

Figure 28:
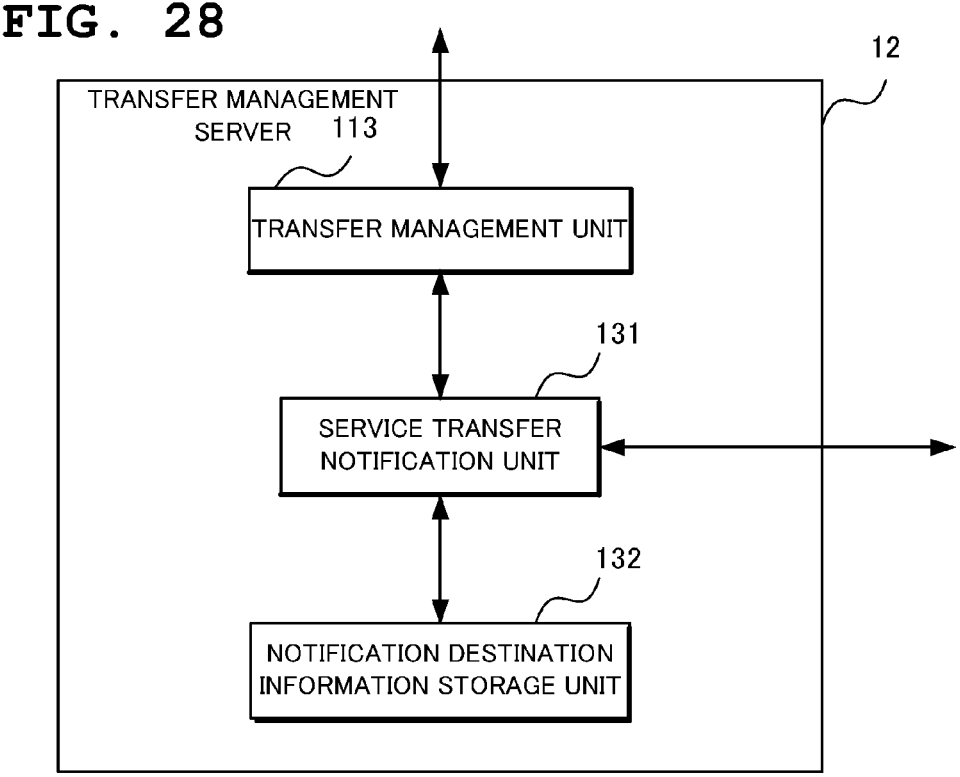
FIG. 28 is a block diagram showing a structure of a transfer management server according to the eighth exemplary embodiment.

Further with reference to FIG. 28, the transfer management server 12 according to the eighth exemplary embodiment includes the transfer management unit (transfer management application) 113, a service transfer notification unit 131 which notifies the service servers 91 to 9*n* of service transfer, and a notification destination information storage unit 132.

The structures of the service servers 91 to 9*n* shown in FIG. 27 and the transfer management server 12 shown in FIG. 28 represent characteristic components related to the present exemplary embodiment and the remaining components that a common server comprises have no description thereof.

Functions of the above-described components of the service servers 91 to 9*n* and the transfer management server 12 will be described in the following.

Figure 29:
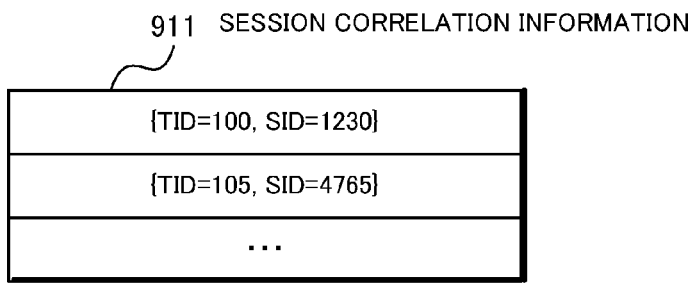
FIG. 29 is a diagram showing a specific example of session correlation information according to the eighth exemplary embodiment.

Similarly to the service servers 21 to 2*n* of the first exemplary embodiment, on the service servers 91 to 9*n*, the service applications 201 to 20*n* for providing each service operate. The session information storage unit 211 stores the session information 902 shown in FIG. 7. The session correlation information storage unit 222 stores such a pair of a terminal ID (TID) and a session ID (SID) as shown in FIG. 29. By referring to the information and the session information 902 stored in the session information storage unit 211, the service servers 91 to 9*n* enable restoration of session information from the terminal ID.

Figure 30:
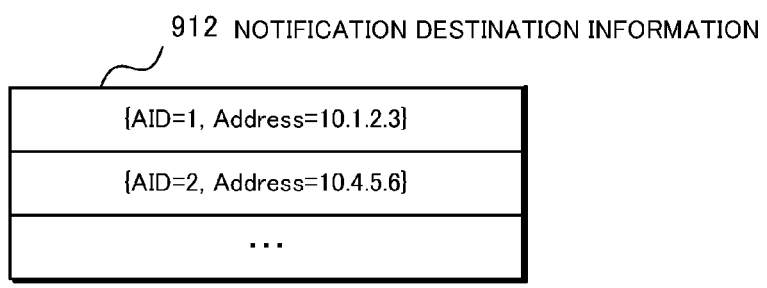
FIG. 30 is a diagram showing a specific example of notification destination information according to the eighth exemplary embodiment.

When the user executes operation of transferring service from the transferring source terminal 3*a* to the transferring destination terminal 3*b*, the transfer management unit 113 of the transfer management server 12 receives a service transfer notification from the terminal 3*a* as a transferring source to notify the service servers 91 to 9*n* of service transfer through the service transfer notification unit 131. Address information of the service servers 91 to 9*n* to be notified at this time is stored in the notification destination information storage unit 132 in advance. Shown in FIG. 30 is an example of address information, in which example the destination information is formed of a pair of an application ID (AID) for identifying a service server and an IP address of a service server. In the present exemplary embodiment, an application ID is not essential.

Upon receiving a service transfer notification from the transfer management server 12, the terminal ID updating unit 221 of the service servers 91 to 9n rewrites a terminal ID of a transferring source included in session correlation information 911 stored in the session correlation information storage unit 222 to a terminal ID of a transferring destination.

Although in the present exemplary embodiment, the session correlation information 911 and the session information 902 are stored separately, a terminal ID may be included in the session information 902, for example, to omit the session correlation information 911.

Operation of the Eighth Exemplary Embodiment

Next, with reference to FIG. 26 through FIG. 30 and the flow chart of FIG. 31, detailed description will be made of the entire operation of the present exemplary embodiment.

First, when a user operates the terminal 3a to start one of client applications (assumed to be the client application 301 here) (Step S801 in FIG. 31), the client application 301 transmits a connection request to the service server 91 with a terminal ID (TID: 100) as an argument (Step S802).

The service server 91 having received the connection request checks the session correlation information 911 stored in the session correlation information storage unit 222 to find whether session information corresponding to the transmitted terminal ID (TID: 100) exists (Step S803). Since connection to the service server 91 of the terminal 3a is the first and session information is yet to be generated here, the service server 91 newly generates such a session ID as shown in the first line of the session information 902 illustrated in FIG. 7 (Step S804). Further as shown in FIG. 29, store the session ID (SID: 1230) in the session correlation information storage unit 222 so as to be correlated with the terminal ID (Step S805).

Thereafter, the service server 91 executes processing necessary for service provision, stores session information which will be necessary in the future as required in the session information storage unit 211 (Step S806) and lastly returns a response to the terminal 3a (Step S807). The terminal 3a executes such processing as screen display for receiving provision of service based on the response.

When the user further operates the terminal 3a to cause another need of connection to the service server 91, connect to the service server 91 with the terminal ID (SID: 100) as an argument (Step S808). The service server 91 searches the session correlation information storage unit 222 to read a session ID (SID: 1230) corresponding to the terminal ID (TID: 100) transmitted from the terminal 3a (Step S809), further reads session information corresponding to the session ID from the session information storage unit 211 (Step S810), and executes necessary processing to return a response to the terminal 3a (Step S811).

As operation to follow, execute the processing of Steps S808 to S811. When a user starts other client application, the same processing as that of Steps 801 to S811 will be repeated with respect to the started application.

Subsequently, description will be made of operation to be executed when transferring the service used by the terminal 3a to the terminal 3b as a transferring destination.

Figure 32:
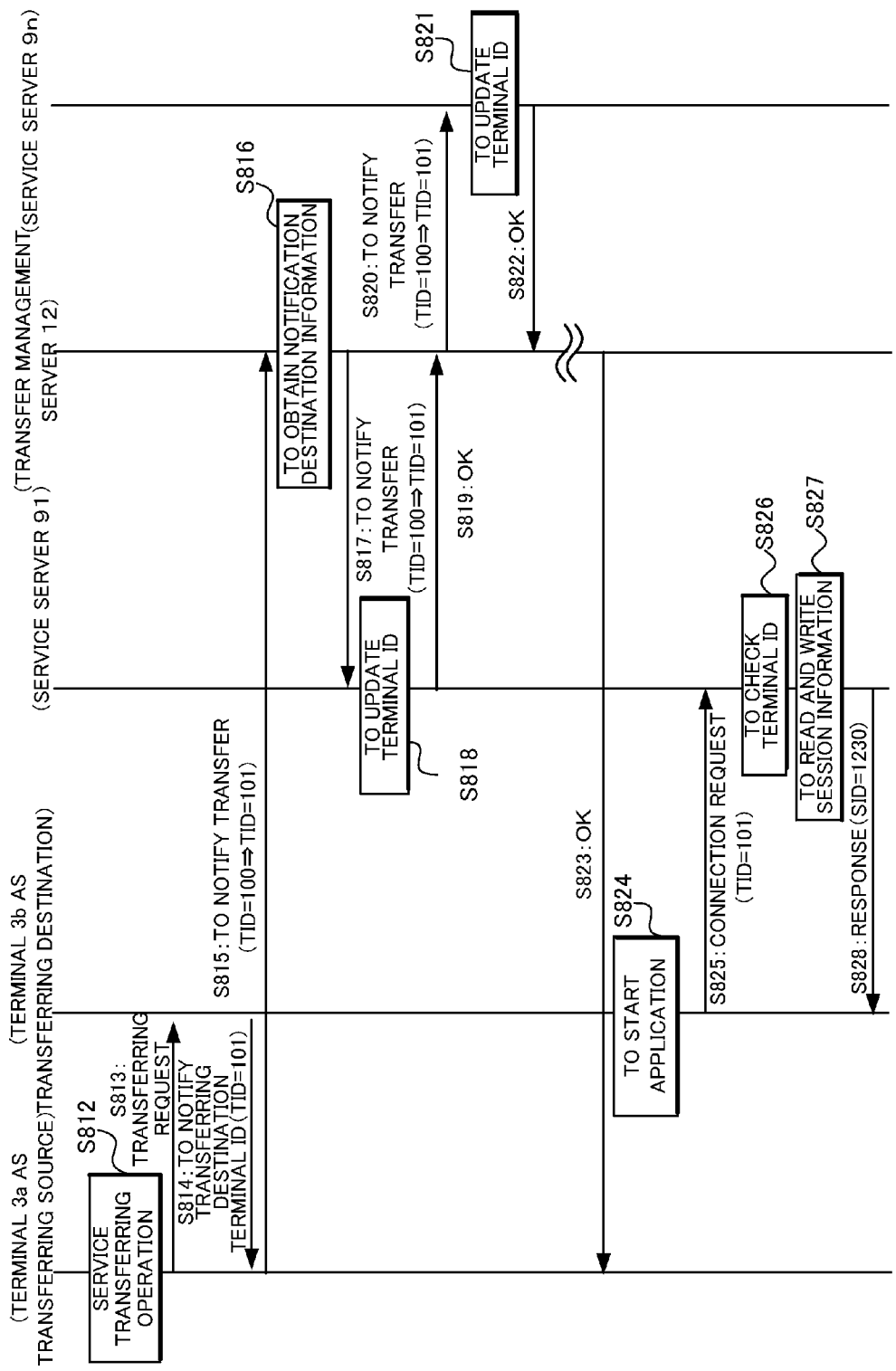
FIG. 32 is a flow chart showing operation according to the eighth exemplary embodiment.

The user operates the terminal 3a as the transferring source to execute service transferring operation (Step S812 in FIG. 32). Then, the service transfer management unit 312 of the terminal 3a as the transferring source communicates with the service transfer management unit 312 of the terminal 3b as the transferring destination to obtain the terminal ID (TID: 101) of the terminal 3b as the transferring destination (Steps S813 and S814).

Then, the service transfer management unit 312 of the terminal 3a notifies the transfer management server 12 of the transfer of the service with the obtained terminal ID (TID: 101) of the terminal 3b as the transferring destination and its own terminal ID (TID: 101) as arguments (Step S815).

When the transfer management unit 113 of the transfer management server 12 receives the service transfer notification, the service transfer notification unit 131 reads, from the notification destination information storage unit 132, destination information of a service server to be notified of service transfer (Step S816) and notifies the service server that the service is transferred from the terminal 3a (TID: 100) to the terminal 3b (TID: 101). Here, first give a notification to the service server 91 (Step S817).

Upon receiving the service transfer notification, the terminal ID updating unit 221 of the service server 91 updates the terminal ID (TID: 100) of the terminal as the transferring source indicated by the session correlation information 911 stored in the session correlation information storage unit 222 to the terminal ID (TID: 101) of the terminal as the transferring destination and returns a response (Steps S818 and S819).

The transfer management server 12 also notifies the remaining service servers of service transfer to execute the same processing (indicated here is only the processing at S820 to S822 with respect to the service server 9n) and lastly returns a notification of processing completion to the terminal 3a (Step S823).

Thereafter, when the user operates the terminal 3b as the transferring destination to activate the client application 301, for example (Step S824), the client application 301 makes a connection request (service request) to the service server 91 with the terminal ID (TID: 101) as an argument (Step S825).

The service server 91 searches the session correlation information storage unit 222 to read a session ID (SID: 1230) corresponding to the terminal ID (TID: 101) transmitted from the terminal 3b (Step S826), and further reads session information corresponding to the session ID from the session information storage unit 211 (Step S827) and executes necessary processing to return a response to the terminal 3b (Step S828).

As operation to be executed hereafter, repeat the processing of Steps S825 to S828. When the user starts other application on the terminal 3b, the same processing as that of Steps S824 to S828 will be executed for the started application.

Although at Steps S815 to S823, the transfer management server 12 returns a response to the terminal 3a as the transferring source after service transfer notification to all the service servers is completed (Step S823), service transfer notification to the service servers may be executed after first returning a response to the terminal 3a (Steps S816 to S822).

Effects of the Eighth Exemplary Embodiment

In addition to the above-described effects of the first exemplary embodiment, the eighth exemplary embodiment obtains the following effects.

According to the first exemplary embodiment, when after service transferring operation, a user operates the terminal 3a as a transferring source to continue the use by mistake, a session ID is transmitted to the service servers 21 to 2n from the client application, so that the service server executes some processing or other to change a state on the service server side. Such a change of the state of the service servers 21 to 2n from a time point where the service transferring operation is executed might prevent the terminal 3b as the transferring destination from normally continuing service.

According to the present exemplary embodiment, however, when a user executes service transferring operation, information about correlation between a terminal ID and a session ID stored in the session correlation information storage unit 222 is updated by the service servers 91 to 9n. As a result, even when the user tries to continuously use service at the terminal as a transferring source by mistake after service transferring operation, since there exists no correlation information corresponding to the terminal ID of the terminal as a transferring source in the session correlation information storage unit 222, the service server side is allowed to detect a failure to interrupt the processing. Accordingly, the state of the service server side will have no change, so that the terminal 3b as the transferring destination is allowed to continue the service normally.

The above-described effect can be obtained also by the second exemplary embodiment. According to the second exemplary embodiment, however, a mechanism is required to cause the service data erasing unit 331 provided in the terminal 4a as a transferring source to control the service data storage unit 321 which is originally desired to be managed by each client application independently in terms of independence of an application. On the other hand, according to the present exemplary embodiment, since the service transfer management unit needs no control of a client application, it is possible to prevent erroneous operation of a terminal as a transferring source while maintaining independence of a client application.

Ninth Exemplary Embodiment

Next, a ninth exemplary embodiment of the present invention will be detailed with reference to the drawings.

Figure 33:
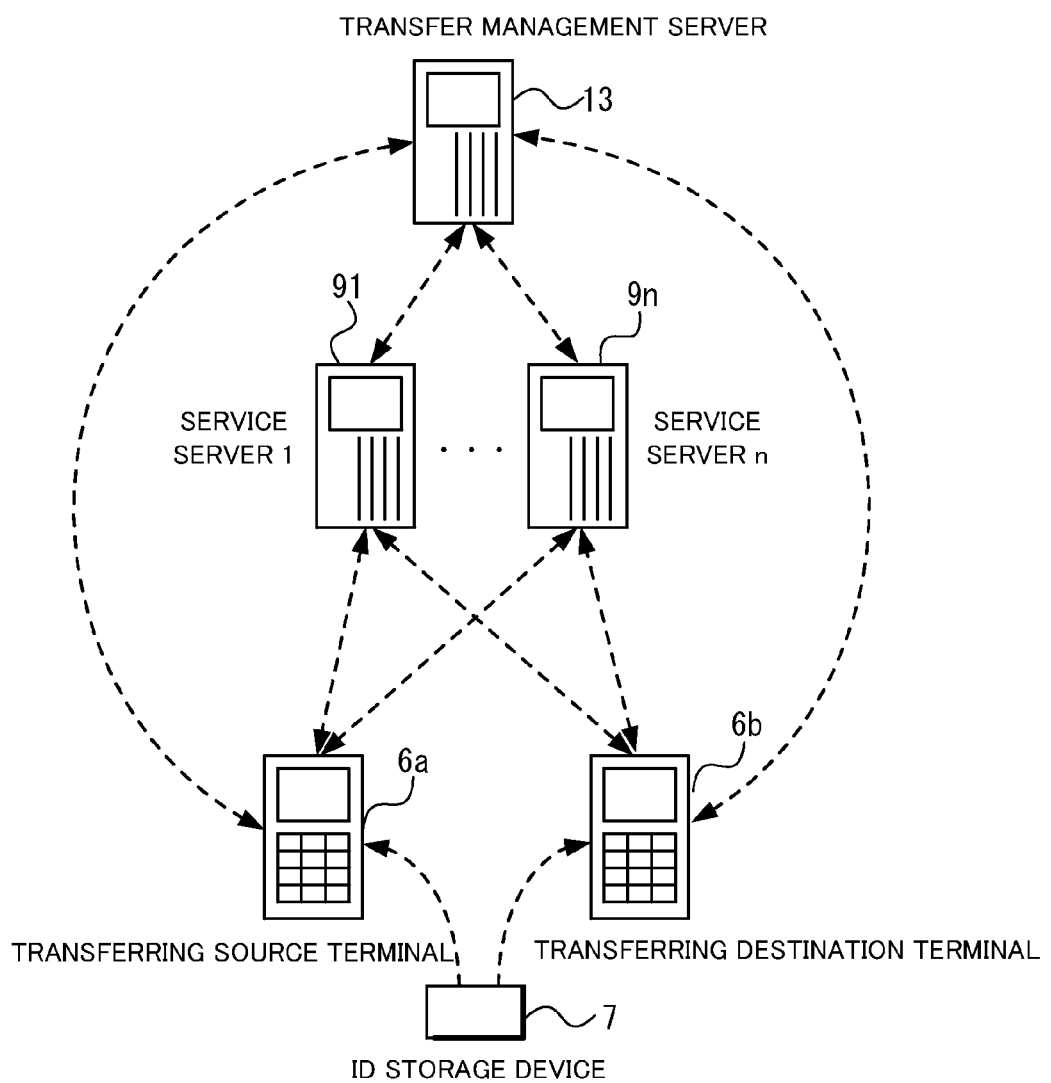
FIG. 33 is a block diagram showing a structure of a system according to a ninth exemplary embodiment.

With reference to FIG. 33, a system according to the ninth exemplary embodiment has a structure which includes a transfer management server 13, one or a plurality of service servers 91 to 9n, a terminal 6a as a transferring source and a terminal 6b as a transferring destination, and the ID storage device 7. The system according to the ninth exemplary embodiment is different from the eighth exemplary embodiment shown in FIG. 26 in the structures of the terminal 6a as a transferring source, the terminal 6b as a transferring destination and the transfer management server 13 and in using the ID storage device 7. The terminal 6a and the terminal 6b and the ID storage device 7 have the same structures as those of the fourth exemplary embodiment shown in FIG. 15.

Figure 34:
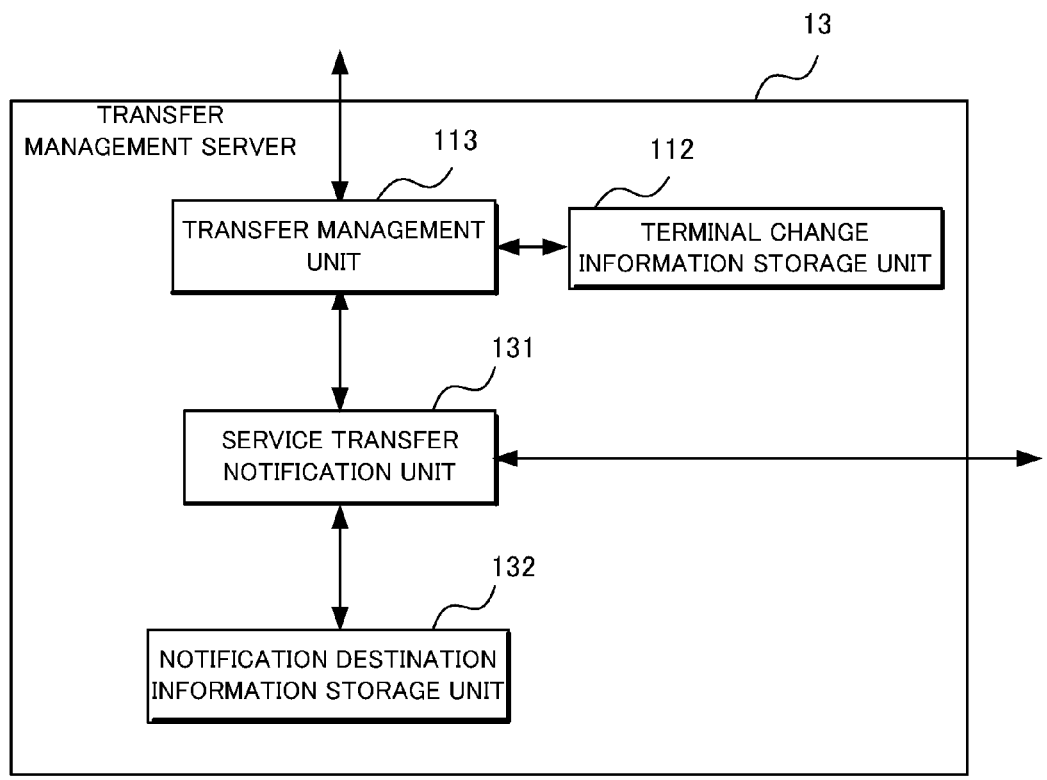
FIG. 34 is a block diagram showing a structure of a transfer management server according to the ninth exemplary embodiment.
Figure 35:
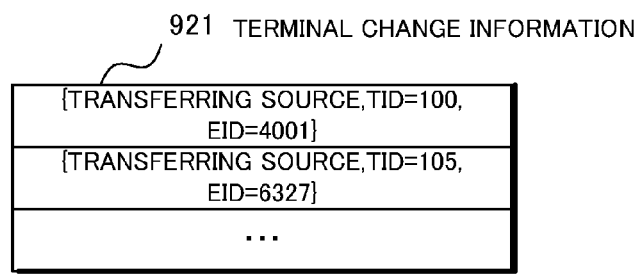
FIG. 35 is a diagram showing a specific example of terminal change information according to the ninth exemplary embodiment.

With reference to FIG. 34, as compared with the transfer management server 12 of the eighth exemplary embodiment, the transfer management server 13 in the ninth exemplary embodiment differs in further comprising the terminal change information storage unit 112. The terminal change information storage unit 112 of the transfer management server 13 stores such terminal change information 921 as shown in FIG. 35.

Operation of the Ninth Exemplary Embodiment

Next, entire operation of the present exemplary embodiment will be detailed with reference to FIG. 33, FIG. 34, FIG. 35 and the flow chart of FIG. 36.

Since the procedure of first operating the terminal 6a to use service by a user is the same as that of the eighth exemplary embodiment shown in FIG. 31, no detailed description will be made thereof.

Figure 36:
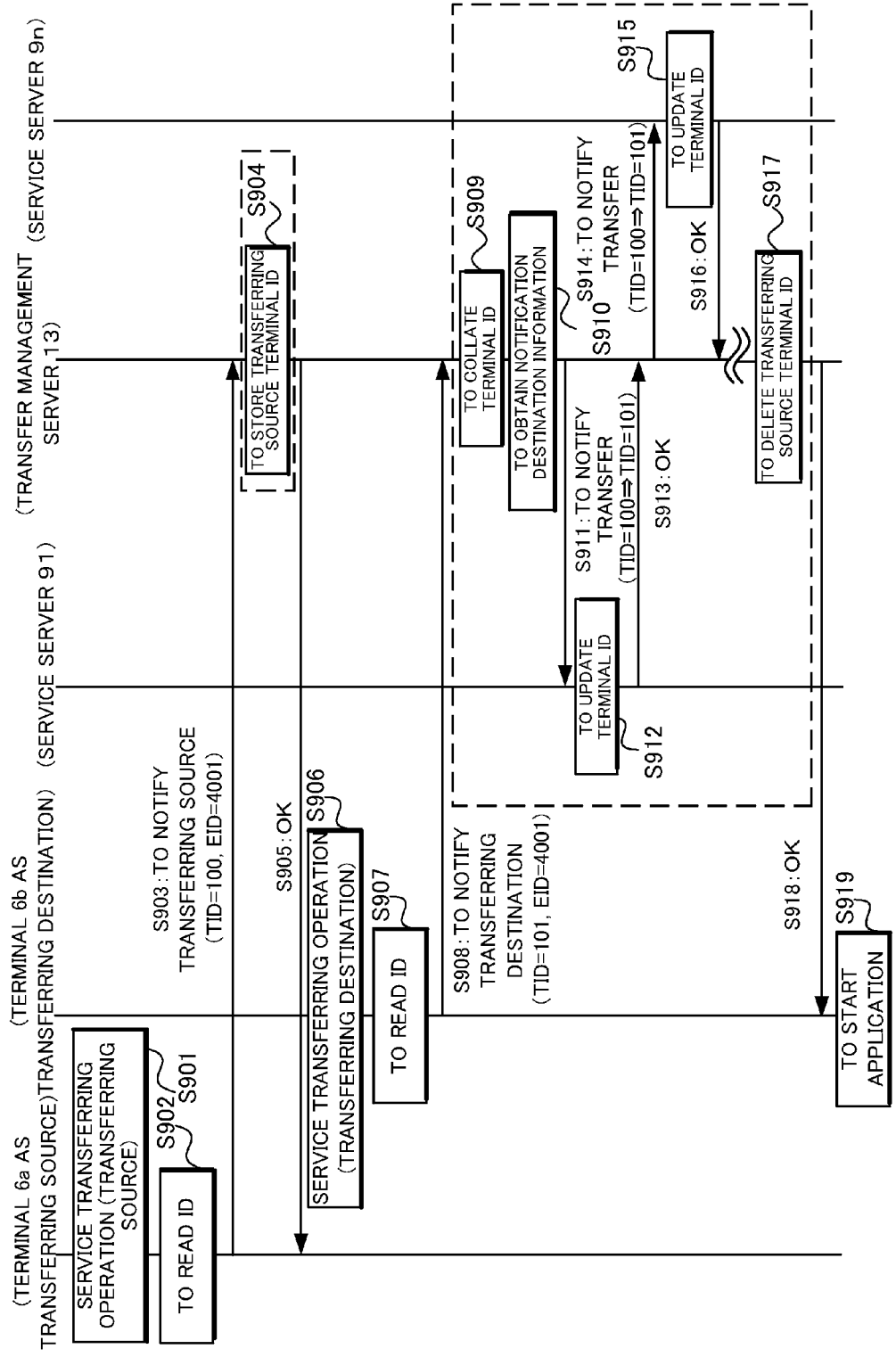
FIG. 36 is a flow chart showing operation according to the ninth exemplary embodiment.

At the time of transferring service used by the terminal 6a to the terminal 6b as a transferring destination, the user operates the terminal 6a as a transferring source to execute the first service transferring operation (Step S901 in FIG. 36). At this time, designate the terminal 6a in question to be a transferring source.

The user operates the ID storage device 7 and the external ID reading unit 341 of the transferring source terminal 6a to execute operation of reading an external ID (assumed to be EID: 4001) from the ID storage device 7 (Step S902). Then, the service transfer management unit 312 of the transferring source terminal 6a notifies the transfer management server 13 of service transfer and the terminal ID of the transferring source with its own terminal ID (TID: 100) and the read external ID (EID: 4001) as arguments (Step S903).

The transfer management unit 113 of the transfer management server 13 records a pair of the terminal ID (TID: 100) and the external ID (EID: 4001) in the terminal change information storage unit 112 (Step S904) to return a notification of recording completion to the terminal 6a (Step S905).

Thereafter, the user operates the transfer destination terminal 6b to execute second service transferring operation (Step S906). At this time, designate the terminal as a transferring destination.

The user operates the same ID storage device 7 and the ID reading unit 341 of the transferring destination terminal 6b as described above to execute operation of reading the external ID (EID: 4001) from the ID storage device 7 (Step S907). Then, the service transfer management unit 312 of the terminal 6b as a transferring destination notifies the transfer management server 13 of service transfer and a terminal ID of the transferring destination with its own terminal ID (TID: 101) and the read external ID (EID: 4001) as arguments (Step S908).

The transfer management unit 113 of the transfer management server 13 determines that the operation of transferring the service from TID: 100 to TID: 101 is executed from the fact that the pair of the external ID (EID: 4001) and TID: 100 is already recorded in the terminal change information storage unit 112 (Step S909). The service transfer notification unit 131 reads, from the notification destination information storage unit 132, address information of a service server to which a notification of service transfer should be made (Step S910) to notify the service server that the service is transferred from the terminal 3a (TID: 100) to the terminal 3b (TID: 101).

Figure 31:
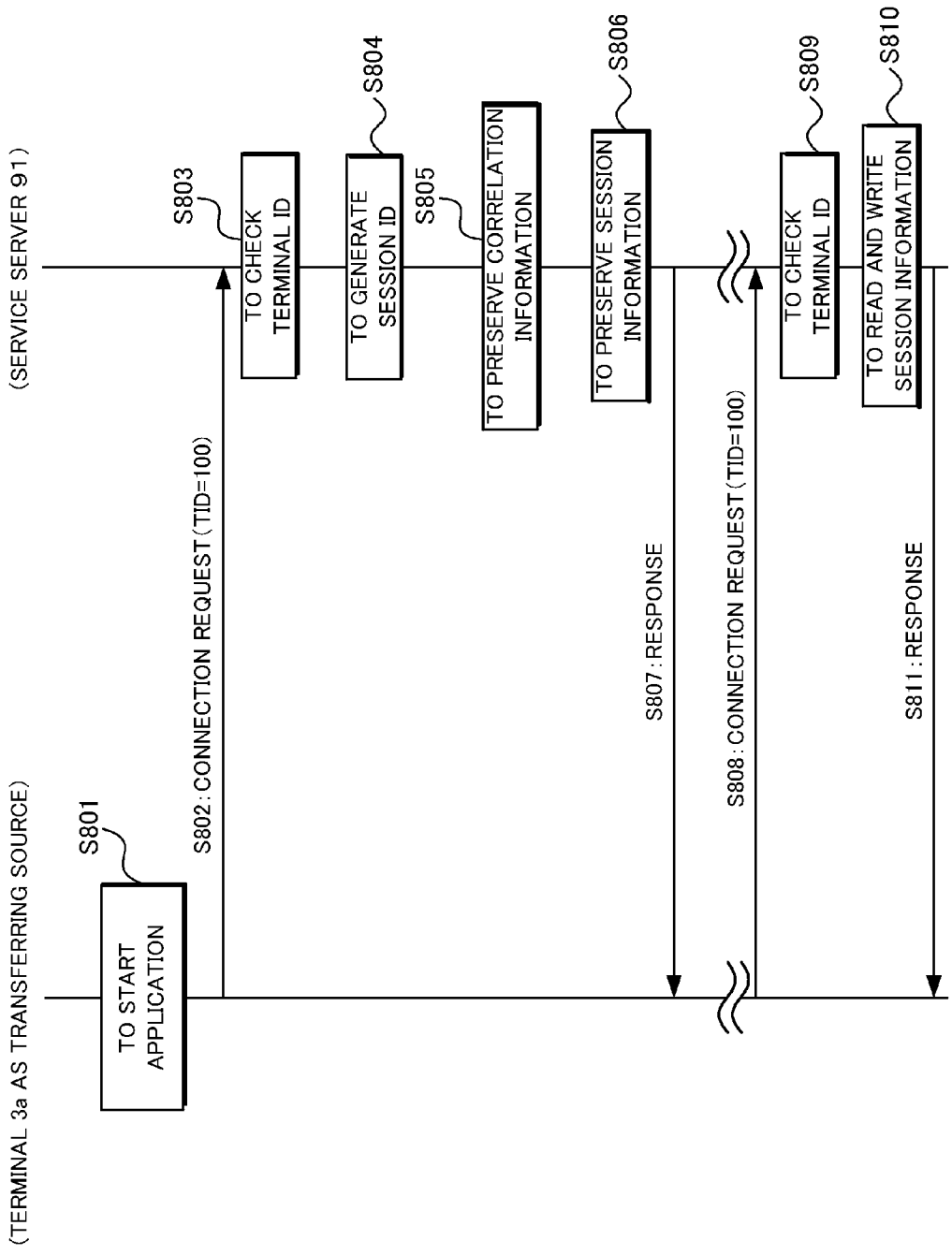
FIG. 31 is a flow chart showing operation according to the eighth exemplary embodiment.

Hereafter, operation at Steps S911 to S916 is the same as that of Steps S817 to S822 in FIG. 31 which shows the procedure of the eighth exemplary embodiment, detailed description of which will be therefore omitted.

Thereafter, after deleting the pair of the terminal ID (TID: 100) and the external ID (EID: 4001) stored in the terminal change information storage unit 112 (Step S917), the transfer management server 13 lastly returns a notification of processing completion to the terminal 6b (Step S918).

Thereafter, although the user operates the transferring destination terminal 6b to start the client application 301, for example (Step S919), since operation to follow is the same as the operation following Step S825 in FIG. 32 which shows the procedure of the eighth exemplary embodiment, no detailed description will be made thereof.

While in the foregoing first and second service transferring operation, it is assumed that the user also designates a terminal to be a transferring source or transferring destination, it is possible to omit user's designation with a terminal which first reads an external ID from the ID storage device 7 to communicate with the transfer management server 13 determined as a terminal as a transferring source and a terminal which reads the ID later to communicate with the transfer management server 13 determined as a terminal as a transferring destination, for example.

Tenth Exemplary Embodiment

Next, a tenth exemplary embodiment of the present invention will be detailed with reference to the drawings.

Figure 37:
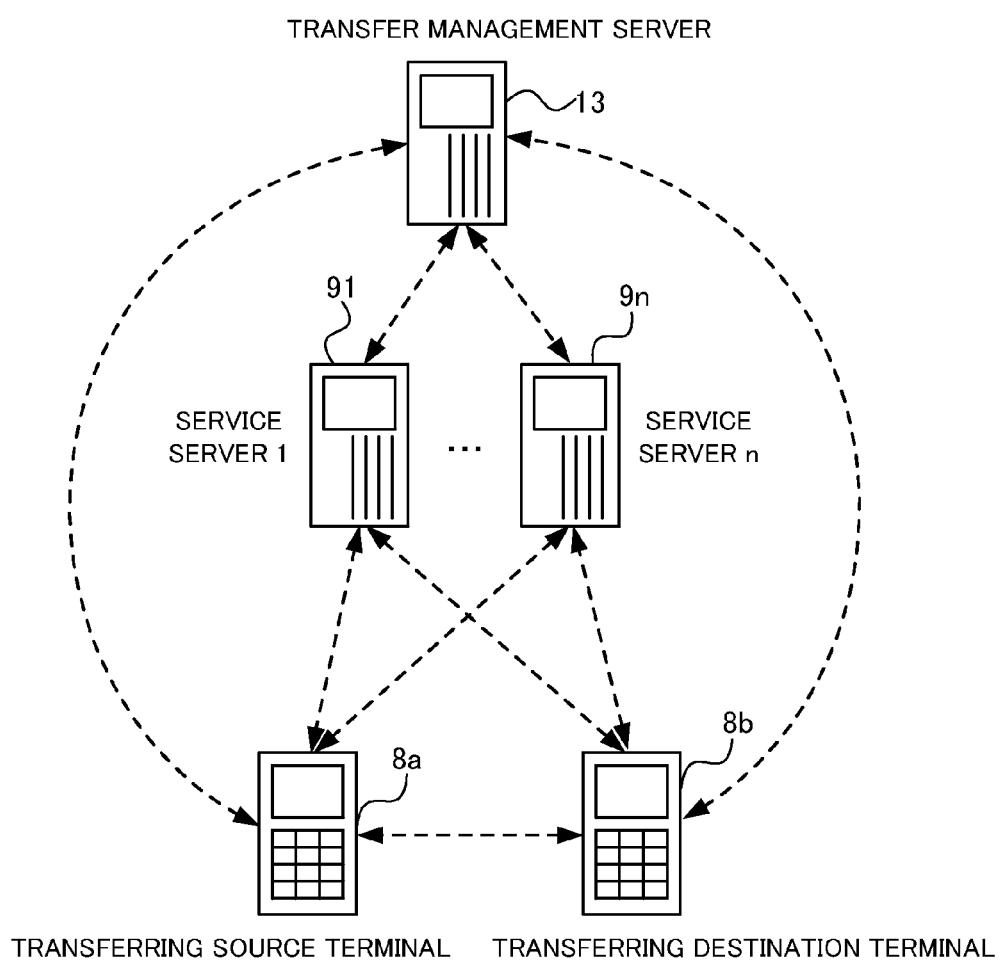
FIG. 37 is a block diagram showing a structure of a system according to a tenth exemplary embodiment.

With reference to FIG. 37, a system according to the tenth exemplary embodiment has a structure which includes the transfer management server 13, one or a plurality of service servers 91 to 9*n*, the terminal 8*a* as a transferring source and the terminal 8*b* as a transferring destination. The system according to the tenth exemplary embodiment is different from the eighth exemplary embodiment shown in FIG. 26 in the structures of the terminal 8*a* as a transferring source, the terminal 8*b* as a transferring destination and the transfer management server 13. The terminal 8*a* and the terminal 8*b* have the same structures as those of the sixth exemplary embodiment shown in FIG. 21 and the transfer management server 13 has the same structure as that of the ninth exemplary embodiment shown in FIG. 34.

Similarly to the ninth exemplary embodiment, the service transfer management units 312 of the terminals 8*a* and 8*b* according to the present exemplary embodiment control the temporary key generation unit 351 to generate a temporary key and exchange the key between the terminals 8*a* and 8*b*, as well as communicating with the transfer management server 13 to execute processing of transferring service between the terminals.

Operation of the Tenth Exemplary Embodiment

Next, entire operation of the present exemplary embodiment will be described.

Since the procedure of first operating the terminal 8*a* to use service by a user is the same as that of the eighth exemplary embodiment shown in FIG. 31, no detailed description will be made thereof.

In addition, the procedure of transferring the service used by the terminal 8*a* to the terminal 8*b* as a transferring destination will be equivalent to a procedure realized by reading Step S605 and Step S608 in FIG. 22 which shows the procedure of the sixth exemplary embodiment as Step S904 and Steps S909 to S917 in FIG. 36 which shows the procedure of the ninth exemplary embodiment, respectively. It is assumed that in place of the external ID (EID) for use in collating a terminal ID of a transferring source and a terminal ID of a transferring destination, a temporary key (Key) is used at Steps S904 and S909.

Since the procedure of operating the transferring destination terminal 8*b* to continue use of service by the user thereafter is the same as the procedure following Step S824 in FIG. 32 which shows the procedure of the eighth exemplary embodiment, no detailed description will be made thereof.

Eleventh Exemplary Embodiment

Next, an eleventh exemplary embodiment of the present invention will be detailed with reference to the drawings.

Figure 38:
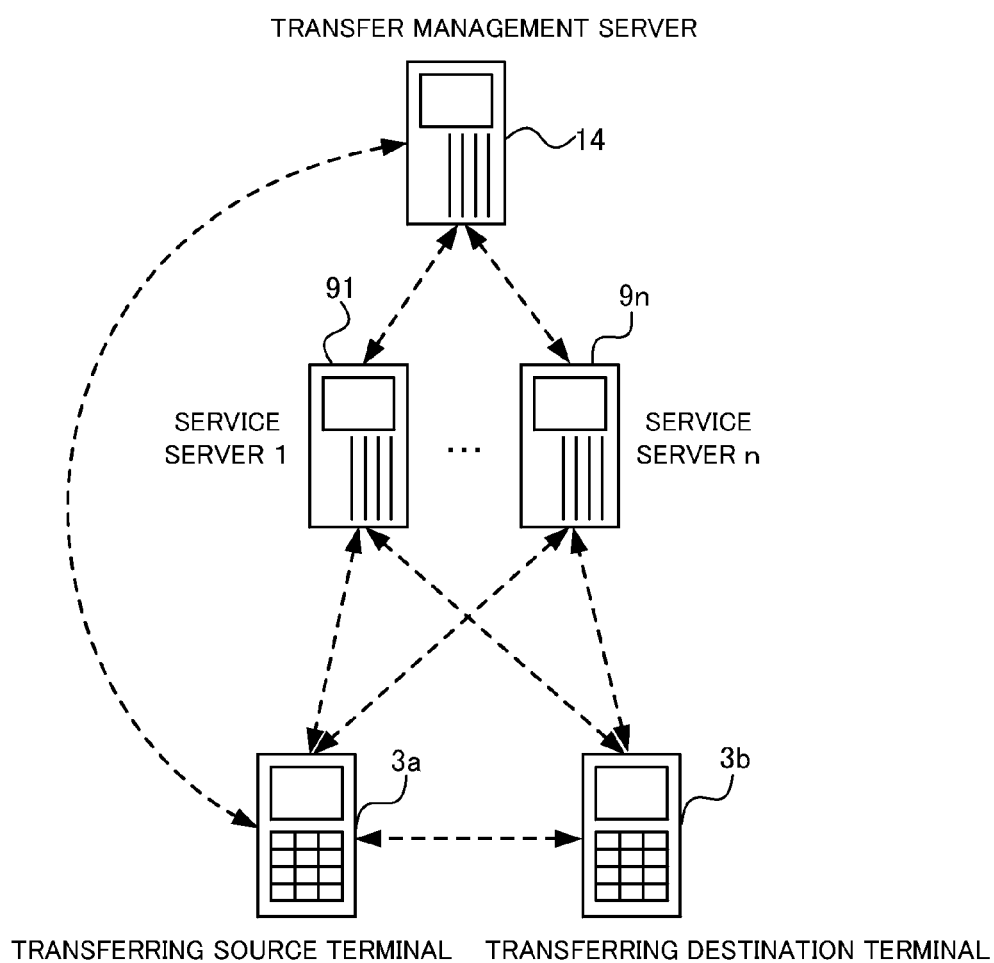
FIG. 38 is a block diagram showing a structure of a system according to an eleventh exemplary embodiment.

With reference to FIG. 38, a system according to the eleventh exemplary embodiment has a structure which includes a transfer management server 14, one or a plurality of service servers 91 to 9*n*, the terminal 3*a* as a transferring source and the terminal 3*b* as a transferring destination. The system according to the eleventh exemplary embodiment is different from the eighth exemplary embodiment shown in FIG. 26 only in the structures of the transfer management server 14. The terminal 3*a* and the terminal 3*b* have the same structures as those of the first exemplary embodiment shown in FIG. 2 and the service servers 91 to 9*n* have the same structure as that of the eighth exemplary embodiment shown in FIG. 27.

With reference to FIG. 39, the transfer management server 14 according to the eleventh exemplary embodiment differs from the transfer management server 13 according to the ninth exemplary embodiment in further comprising the user authentication information storage unit 121.

Similarly to the seventh exemplary embodiment, at the time of receiving a service transfer notification from the terminal 3*a* as a transferring source and the terminal 3*b* as a transferring destination, the transfer management server 14 according to the present exemplary embodiment requests each terminal for user authentication. By thus executing user authentication by the same user at both the terminals, the terminal 3*a* as a transferring source and the terminal 3*b* as a transferring destination are correlated.

Operation of the Eleventh Exemplary Embodiment

Next, entire operation of the present exemplary embodiment will be detailed.

Since the procedure of first operating the terminal 3*a* to use service by a user is the same as that of the eighth exemplary embodiment shown in FIG. 31, no detailed description will be made thereof.

In addition, the procedure of transferring the service used by the terminal 3*a* to the terminal 3*b* as a transferring destination will be equivalent to a procedure realized by reading Step S705 and Step S711 in FIG. 25 which shows the procedure of the seventh exemplary embodiment as Step S904 and Steps S909 to S917 in FIG. 36 which shows the procedure of the ninth exemplary embodiment, respectively. It is assumed that in place of the external ID (EID) for use in collating a terminal ID of a transferring source and a terminal ID of a transferring destination, a user ID (UID) is used at Steps S904 and S909.

Thereafter, the procedure of operating the transferring destination terminal 3*b* to continue use of service by the user is the same as the procedure following Step S824 in FIG. 32 which shows the procedure of the eighth exemplary embodiment, detailed description of which will be therefore omitted.

Here, a hardware structure of the terminal according to each of the exemplary embodiments will be described with reference to FIG. 40.

With reference to FIG. 40, the terminals 3*a* and 3*b* to 7*a* and 7*b*, which can be realized by the same hardware structure as that of a common computer, comprise a CPU (Central Processing Unit) 401, a main storage unit 402 which is a main memory such as a RAM (Random Access Memory) for use as a data working region or a data temporary saving region, a communication unit 403 which transmits and receives data to/from other device through a network, an input/output interface unit 404 connected to an input device 405 such as a keyboard or a mouse, an output device 406 such as a display device and a storage device 407 to transmit and receive data, and a system bus 408 which connects the respective components with each other. The storage device 407 can be realized by a hard disk device or the like formed of a non-volatile memory such as a ROM (Read Only Memory), a magnetic disk or a semiconductor memory.

The terminal in each of the exemplary embodiments has its operation realized not only in hardware by mounting a circuit part which is a hardware part such as an LSI (Large Scale Integration) with a program which executes service transferring processing incorporated but also in software by storing a program which provides each function that a terminal comprises in the storage device 407 and loading the program into the main storage unit 402 to execute the program by the CPU 401.

The hardware structures of the service servers 21 to 2n and the transfer management server 10 are also the same as those of the terminal shown in FIG. 40, which can be realized in hardware by mounting a circuit part which is a hardware part such as an LSI (Large Scale Integration) with a program which executes service transferring processing incorporated but also in software by storing a program which provides each function of the service servers 21 to 2n and the transfer management server 10 in the storage device 407 and loading the program into the main storage unit 402 to execute the program by the CPU 401.

The respective exemplary embodiments can be also structured such that with a terminal ID of a terminal which uses the service of the service servers 21 to 2n registered in advance as terminal information in the service servers 21 to 2n or the transfer management server 10, when receiving a notification of service transfer from the terminal, the service servers 21 to 2n or the transfer management server 10 determines whether the transfer notification comes from an authorized terminal registered in advance.

When at least one of the terminal IDs of a terminal as a transferring source and a terminal as a transferring destination which are transmitted by the notification of service transfer differs from the terminal ID registered in advance, such structure as described in the foregoing enables such a transfer notification to be refused to further improve security in service transfer between the terminals.

In addition, while the above-described respective exemplary embodiments have been described with respect to the structure comprising an individual transfer management server, a structure without a transfer management server is possible by providing at least one of service servers with a function as a transfer management server having the above-described structure.

Although the present invention has been described with respect to the preferred exemplary embodiments in the foregoing, the present invention is not necessarily limited to the above-described exemplary embodiments and can be implemented in various modifications without departing from the scope of its technical idea.

INCORPORATION BY REFERENCE

This application is based upon and claims the benefit of priority from Japanese patent application No. 2008-220228, filed on Aug. 28, 2008, and No. 2009-027642, filed on Feb. 9, 2009 the disclosure of which is incorporated herein in its entirety by reference.

INDUSTRIAL APPLICABILITY

The present invention is applicable to such use for, while a user uses service in various kinds of on-line services or on-line games in which such a terminal is used as a personal computer, a cellular phone, a game set, a television set and a car navigation system, switching the service to another terminal with ease.

What is claimed is:

1. A service transferring method of transferring service being used at a transferring source terminal to a transferring destination terminal, the method comprising:
recording information about a relation between a session identification (ID) and a terminal identification (ID) of said transferring source terminal using said service in at least one of a service server and a transfer management server, the session ID identifying a session between said service server which provides said service and said transferring source terminal;
transmitting, by one of the transferring source terminal and the transferring destination terminal, a terminal ID of the one of the transferring source terminal and the transferring destination terminal and a terminal identification (ID) of the other of the transferring source terminal and the transferring destination terminal to said transfer management server to notify service transfer;
upon receiving a notification of the transfer of said service, updating the information about the relation between said session ID and said terminal ID recorded in either said service server or said transfer management server so that the session ID and the terminal ID of the transferring destination terminal relate with each other; and
obtaining, by the service server having received a service request from the transferring destination terminal, the session ID related to the terminal ID of the transferring destination terminal from the relation information, and providing the service for the transferring destination terminal using the information identified by the session ID.

2. The method of transferring service between terminals according to claim 1, further comprising:
recording information about the relation between said session ID and said terminal ID of the transferring source terminal in said transfer management server; and
obtaining, by the service server having received the service request from the transferring destination terminal, the session ID related to the terminal ID of said transferring source terminal or the terminal ID of the transferring destination terminal from said relation information in said transfer management server, and transmitting the obtained session ID to said transferring destination terminal.

3. The method of transferring service between terminals according to claim 2, further comprising:
transmitting, by the transferring source terminal, the terminal ID of one of the transferring destination terminal and the transferring source terminal to said service server to request service, and
starting, by the service server, a new session with said transferring source terminal, and transmitting information about a session with said transferring source terminal and the terminal ID of said transferring source terminal to said transfer management server.

4. The method of transferring service between terminals according to claim 2, further comprising:
transmitting the terminal ID of said transferring destination terminal from said transferring destination terminal to said service server to request service;
transmitting, by the service server having received the service request from the transferring destination terminal, the terminal ID of said transferring destination terminal to said transfer management server; and
referring, by the transfer management server, to said relation information, and transmitting said session ID related to the terminal ID of said transferring destination terminal to said service server.

5. The method of transferring service between terminals according to claim 4, wherein upon receiving a notification of transfer of said service, said transfer management server stores the terminal ID of said transferring source terminal and the terminal ID of said transferring destination terminal as terminal change information, and said transfer management server refers to said relation information and said terminal change information and transmits said session ID related to the terminal ID of said transferring destination terminal to said service server.

6. The method of transferring service between terminals according to claim 4, further comprising:

respectively transmitting, by each of the transferring source terminal and the transferring destination terminal, the terminal ID of one of the transferring source terminal and the transferring destination terminal and an identification ID which is unique between said transferring source terminal and said transferring destination terminal to said transfer management server to notify the service transfer;

storing, by the transfer management server when the transfer management server receives a notification of transfer of the service, a pair of the terminal ID of said transferring source terminal and said identification ID and a pair of the terminal ID of said transferring destination terminal and said identification ID so as to correspond to each other as terminal change information; and referring, by the transfer management server, to said relation information and said terminal change information, and transmitting said session ID related to the terminal ID of said transferring destination terminal to said service server.

7. The method of transferring service between terminals according to claim 2, further comprising:

obtaining, by one of the transferring source terminal and the transferring destination terminal, said terminal ID from the other of the transferring source terminal and the transferring destination terminal; and transmitting, by the one of the transferring source terminal and the transferring destination terminal, the terminal ID of the one terminal and the terminal ID of the other terminal to said transfer management server to notify the service transfer.

8. The method of transferring service between terminals according to claim 7, wherein the one of said transferring source terminal and said transferring destination terminal obtains said terminal ID of the other terminal by wireless communication including wireless local area network (LAN) and infrared communication or wired connection by a cable.

9. The method of transferring service between terminals according to claim 1, further comprising:

recording information about the relation between said session ID and said terminal ID of the transferring source terminal to said service server; and upon receiving a notification of transfer of said service from said transferring source terminal or said transferring destination terminal, notifying the service transfer to at least one of service servers including said service server by the transfer management server.

10. The method of transferring service between terminals according to claim 9, wherein each of said transferring source terminal and said transferring destination terminal respectively transmits the terminal ID of one of the transferring source terminal and the identification ID which is unique between said transferring source terminal and said transferring destination terminal to said transfer management server to notify service transfer, when receiving a notification of transfer of said service, said transfer management server stores a pair of the terminal ID of said transferring source terminal and said identification ID and a pair of the terminal ID of said transferring destination terminal and said identification ID so as to correspond to each other as terminal change information, and said transfer management server refers to said terminal change information and notifies the transfer of the service with the terminal ID of said transferring source terminal and the terminal ID of said transferring destination terminal to said service server.

11. The method of transferring service between terminals according to claim 1, wherein after notifying the transfer of the service to said transfer management server, said transferring source terminal erases data related to service which is held while the service is used.

12. The method of transferring service between terminals according to claim 1, wherein after notifying service transfer to said transfer management server, said transferring destination terminal transmits the terminal ID of said transferring destination terminal to said service server to request data necessary for restructuring data related to the service used by said transferring source terminal, said service server transmits data necessary for restructuring data related to said service to said transferring destination terminal based on said session information corresponding to the session ID related to the terminal ID of said transferring destination terminal, and said transferring destination terminal reconstructs data related to the service based on said data necessary for restructuring.

13. A transfer management server which manages transfer of service being used by a transferring source terminal to a transferring destination terminal, the transfer management server comprising:

a relation information storage unit which records information about a relation between a session identification (ID) and a terminal identification (ID) of said transferring source terminal using said service in at least one of a service server and a transfer management server, the session ID identifying a session between said service server which provides said service and said transferring source terminal; and a transfer management unit which updates the information about the relation between the session ID and the terminal ID recorded in either the service server or the transfer management server upon receiving, from one terminal of the transferring source terminal and the transferring destination terminal, a terminal ID of the one terminal and a terminal ID of the other terminal of the transferring source terminal and the transferring destination terminal so that the session ID and the terminal ID of the transferring destination terminal relate with each other, and which, when a request for obtaining the session ID related to the terminal ID of said transferring source terminal or the transferring destination terminal is made from said service server having received a service request from said transferring destination terminal, notifies said service server of the session ID related to the terminal ID of said transferring source terminal or the transferring destination terminal by referring to said relation information,
wherein the service server stores session information on the service used by the transferring source terminal, and provides the service for the transferring destination terminal using the session information identified by the received session ID.

14. The transfer management server according to claim 13, wherein
when said service server starts a new session with said transferring source terminal, said transfer management unit receives said session ID and the terminal ID of said transferring source terminal transmitted from said service server and records said relation information in said correlation information storage unit.

15. The transfer management server according to claim 13, further comprising:
a terminal change information storage unit which, when receiving, from said transferring source terminal or said transferring destination terminal, a notification of service transfer with the terminal ID of the respective terminal in and the terminal ID of the other terminal, records the terminal ID of said transferring source terminal and the terminal ID of said transferring destination terminal as terminal change information, wherein
said transfer management unit transmits said session ID related to the terminal ID of said transferring destination terminal to said service server by referring to said relation information and said terminal change information.

16. The transfer management server according to claim 13, further comprising:
a terminal change information storage unit which, when receiving, from said transferring source terminal and said transferring destination terminal, a notification of service transfer with the terminal ID of the respective terminal and an identification ID which is unique between said transferring source terminal and said transferring destination terminal, records a pair of the terminal ID of said transferring source terminal and said identification ID and a pair of the terminal ID of said transferring destination terminal and said identification ID so as to correspond to each other as terminal change information, wherein
said transfer management unit transmits said session ID related to the terminal ID of said transferring destination terminal to said service server by referring to said relation information and said terminal change information.

17. A terminal which uses service provided by a service server, the terminal comprising:
a terminal identification (ID) storage unit which stores a terminal identification (ID) applied to the terminal;
at least one client application that transmits said terminal ID to said service server to make a service request; and
a service transfer management unit which transmits a terminal ID of another terminal as a transferring source or a transferring destination for a service and said terminal ID of the terminal to a transfer management server which stores information about a relation between a session identification (ID) which identifies a session between said service server and the transferring source terminal using the service and the terminal ID of said transferring source terminal to notify transfer of service between the terminals,
wherein the service transfer management unit updates the information of the relation between the session ID and the terminal ID recorded in either one of the service server or the transfer management server upon receiving, from one terminal of the transferring source terminal and the transferring destination terminal, the terminal ID of the one terminal and the terminal ID of the other terminal so that the session ID and the terminal ID of the transferring destination terminal relate with each other, and transmits the session ID related to the received terminal ID to the service server, and
the service server stores session information on the service used by the transferring source terminal, and provides the service for the transferring destination terminal using the session information identified by the obtained session ID upon receiving the request from the transferring destination terminal and obtaining the session ID.

18. The terminal according to claim 17, wherein said service transfer management unit obtains said terminal ID from the other terminal as a transferring source or a transferring destination and transmits the terminal ID of the respective terminal and the obtained terminal ID of the other terminal to said transfer management server to notify service transfer.

19. The terminal according to claim 18, wherein said service transfer management unit obtains said terminal ID of the other terminal by wireless communication including wireless local area network (LAN) and infrared communication or wired connection by a cable.

20. A service server which provides a terminal with service, comprising:
a session information storage unit which stores information about a session with said transferring source terminal using said service,
wherein the service server is configured to transmit a session identification (ID) which identifies said session information and a terminal identification (ID) of said transferring source terminal to a transfer management server which records information about a relation between said session ID and the terminal ID of said transferring source terminal, and updates the information about the relation between the session ID and the terminal ID recorded in either of the service server or the transfer management server upon receiving, from one terminal of the transferring source terminal and the transferring destination terminal, a terminal ID of the one terminal and a terminal ID of the other of the transferring source terminal and the transferring destination terminal so that the session ID and the terminal ID of the transferring destination terminal relate with each other, and
the service server is configured to obtain the session ID related to the terminal ID of said transferring source terminal or the transferring destination terminal from said relation information of said transfer management server upon receiving a service request from said transferring destination terminal and transmitting said obtained session ID to said transferring destination terminal, and is configured to provide the service for the transferring destination terminal using the session information identified by the session ID.

21. The service server according to claim 20, wherein the service server is configured to start a new session with said transferring source terminal in response to a service request with the terminal ID from said transferring source terminal and transmitting said session ID of information about a session with said transferring source terminal and the terminal ID of said transferring source terminal to said transfer management server.

22. The service server according to claim 20, which wherein the service server is configured to transmit the terminal ID of said transferring destination terminal to said transfer management server and obtain said session ID related to the terminal ID of said transferring destination terminal from said transfer management server, and is configured to transmit said session ID obtained to said transferring destination terminal, upon receiving the service request from said transferring destination terminal.

23. The service server according to claim 20, wherein
the session information storage unit stores the information about the session with said transferring source terminal using said service and the terminal ID of said transferring source terminal so as to be related with each other, and
the service server further comprises
a service transfer notification receiving unit which receives a service transfer notification from the transfer management server, when said service transfer notification receiving unit receives a service transfer notification from said transfer management server, the service server rewrites said terminal ID related with said session information of said session information storage unit.

24. A program to be executed on a terminal that uses service provided by a service server, which causes said terminal to execute a method, comprising:
transmitting a terminal identification (ID) applied to the terminal to said service server to make a service request;
transmitting said terminal ID of another terminal as a service transferring source or transferring destination and said terminal ID of the terminal to a transfer management server which stores information about relation between a session identification (ID) which identifies a session between said service server and the transferring source terminal using the service and the terminal ID of said transferring source terminal to notify transfer of the service between the terminals;
updating, by the transfer management server, the information about the relation between the session ID and the terminal ID recorded in either the service server or the transfer management server upon receiving, from one terminal of the transferring source terminal and the transferring destination terminal, the terminal ID of the one terminal and the terminal ID of the other terminal; and
storing, by the service server, session information on the service used by the transferring source terminal, and providing the service for the transferring destination terminal by using the session information identified by the received session ID upon receiving the terminal ID from the transferring destination terminal to make the service request.

25. The program according to claim 24, further comprising:
obtaining said terminal ID from the other terminal as a transferring source or a transferring destination; and
transmitting the terminal ID of the terminal and the obtained terminal ID of the other terminal to said transfer management server to notify the service transfer.

26. A program to be executed on a transfer management server that manages transfer of service being used by a transferring source terminal to a transferring destination terminal, which causes said transfer management server to execute a method, comprising:
recording, in a relation information storage unit, information about a relation between a session identification (ID) and a terminal identification (ID) of said transferring source terminal using said service in at least one of a service server and a transfer management server, the session ID identifying a session between said service server which provides said service and said transferring source terminal;
updating the information about the relation between the session ID and the terminal ID recorded in either of the service server or the transfer management server upon receiving, from one terminal of the transferring source terminal and the transferring destination terminal, the terminal ID of the one terminal and the terminal ID of the other of the transferring source terminal and the transferring destination terminal so that the session ID and the terminal ID of the transferring destination terminal relate with each other;
referring to said relation information to notify said service server of the session ID related to the terminal ID of said transferring source or transferring destination terminal when a request for obtaining a session ID related to the terminal ID of said transferring source or transferring destination terminal is made from said service server having received a service request from said transferring destination terminal; and
storing, by the service server, session information on the service used by the transferring source terminal, and providing the service for the transferring destination terminal by using the session information identified by the received session ID upon receiving the terminal ID from the transferring destination terminal to make the service request.

27. The program according to claim 26, further comprising:
when said service server starts a new session with said transferring source terminal, receiving said session ID and the terminal ID of said transferring source terminal transmitted from said service server to record said relation information in said relation information storage unit.

28. The program according to claim 26, further comprising:
when receiving, from one of said transferring source terminal or said transferring destination terminal, a notification of service transfer with the terminal ID of the one of the transferring source terminal and the transferring destination terminal and the terminal ID of the other of the transferring source terminal and the transferring destination terminal, recording the terminal ID of the transferring source terminal and the terminal ID of said transferring destination terminal as terminal change information in a terminal change information storage unit; and
referring to said relation information and said terminal change information to transmit said session ID related to the terminal ID of said transferring destination terminal to said service server.

29. The program according to claim 26, further comprising:
when receiving, from said transferring source terminal and said transferring destination terminal, a notification of service transfer with the terminal ID of the respective terminal and an identification ID which is unique between said transferring source terminal and said transferring destination terminal, recording a pair of the terminal ID of the transferring source terminal and said identification ID and a pair of the terminal ID of said transferring destination terminal and said identification ID so as to correspond to each other as terminal change information in a terminal change information storage unit, and referring to said relation information and said terminal change information to transmit said session ID related to the terminal ID of said transferring destination terminal to said service server.

\* \* \* \* \*